US010234871B2

(12) United States Patent
Klaus et al.

(10) Patent No.: US 10,234,871 B2
(45) Date of Patent: Mar. 19, 2019

(54) DISTRIBUTED SAFETY MONITORS FOR AUTOMATED VEHICLES

(71) Applicant: Peloton Technology, Inc., Mountain View, CA (US)

(72) Inventors: Todd Christopher Klaus, San Jose, CA (US); Colleen Kelly Twitty, San Francisco, CA (US); Stephen Michael Erlien, Mountain View, CA (US); John Connelly Kegelman, Mountain View, CA (US); Charles A. Price, Los Altos, CA (US); Austin Bennett Schuh, Los Altos, CA (US); Joshua Philip Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

(21) Appl. No.: 15/860,024

(22) Filed: Jan. 2, 2018

(65) Prior Publication Data

US 2018/0143651 A1    May 24, 2018

Related U.S. Application Data

(60) Continuation-in-part of application No. PCT/US2017/047825, filed on Aug. 21, 2017, and a
(Continued)

(51) Int. Cl.
*G06F 19/00* (2018.01)
*G05D 1/02* (2006.01)
(Continued)

(52) U.S. Cl.
CPC ....... *G05D 1/0293* (2013.01); *B60R 16/0231* (2013.01); *B60W 10/06* (2013.01);
(Continued)

(58) Field of Classification Search
None
See application file for complete search history.

(56) References Cited

U.S. PATENT DOCUMENTS 3,725,921 A    4/1973  Weidman et al.
4,370,718 A    1/1983  Chasek
(Continued)

FOREIGN PATENT DOCUMENTS

DE    102011002275    10/2012
EP       3316064         5/1918
(Continued)

OTHER PUBLICATIONS

Kuszmaul et al., U.S. Appl. No. 15/605,456, filed May 25, 2017.
(Continued)

*Primary Examiner* — Bhavesh V Amin
(74) *Attorney, Agent, or Firm* — Beyer Law Group LLP

(57) ABSTRACT

Controllers, control architectures, systems and methods are described for controlling a host vehicle's participation in a platoon. In some embodiments, a vehicle control system includes a vehicle controller configured to determine vehicle control commands for at least partially automatically controlling the host vehicle based at least in part on sensor information. The vehicle control commands are arranged to be directly or indirectly utilized by one or more host vehicle control units resident on the host vehicle. The vehicle control system also includes one or more safety monitoring algorithms that, during at least partially automated driving, verify that selected vehicle control commands received from the vehicle controller meet selected safety criteria. At least some of the safety algorithms utilize sensor data in the verification of the commands received from the vehicle controller. The sensor data used by the safety algorithms may come from the host vehicle and/or a second vehicle.

30 Claims, 7 Drawing Sheets

Related U.S. Application Data continuation-in-part of application No. 15/607,316, filed on May 26, 2017, which is a continuation of application No. 14/292,583, filed on May 30, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006, application No. 15/860,024, which is a continuation-in-part of application No. 15/589,124, filed on May 8, 2017, which is a continuation of application No. 14/855,044, filed as application No. PCT/US2014/030770 on Mar. 17, 2014, now Pat. No. 9,645,579, application No. 15/860,024, which is a continuation-in-part of application No. 15/590,803, filed on May 9, 2017.

(60) Provisional application No. 62/377,970, filed on Aug. 22, 2016, provisional application No. 61/505,076, filed on Jul. 6, 2011, provisional application No. 61/792,304, filed on Mar. 15, 2013.

(51) Int. Cl.

| | | |
|---|---|---|
| *G01G 19/08* | (2006.01) | |
| *B60W 30/165* | (2012.01) | |
| *G05D 1/00* | (2006.01) | |
| *G08G 1/00* | (2006.01) | |
| *B60R 16/023* | (2006.01) | |
| *G07C 5/00* | (2006.01) | |
| *B60W 40/13* | (2012.01) | |
| *G01G 19/02* | (2006.01) | |
| *B60W 10/06* | (2006.01) | |
| *B60W 10/10* | (2012.01) | |
| *B60W 10/184* | (2012.01) | |
| *B60W 10/20* | (2006.01) | |
| *B60W 10/22* | (2006.01) | |
| *B60W 30/14* | (2006.01) | |
| *B60W 30/18* | (2012.01) | |
| *H04W 4/46* | (2018.01) | |
| *G01S 19/13* | (2010.01) | |
| *H04L 29/08* | (2006.01) | |
| *H04W 84/00* | (2009.01) | |

(52) U.S. Cl.

CPC .......... *B60W 10/10* (2013.01); *B60W 10/184* (2013.01); *B60W 10/20* (2013.01); *B60W 10/22* (2013.01); *B60W 30/14* (2013.01); *B60W 30/165* (2013.01); *B60W 30/18* (2013.01); *B60W 40/13* (2013.01); *G01G 19/022* (2013.01); *G01G 19/086* (2013.01); *G05D 1/0088* (2013.01); *G05D 1/02* (2013.01); *G05D 1/0278* (2013.01); *G05D 1/0285* (2013.01); *G05D 1/0295* (2013.01); *G07C 5/008* (2013.01); *G08G 1/22* (2013.01); *B60W 2300/12* (2013.01); *B60W 2510/0657* (2013.01); *B60W 2510/1005* (2013.01); *B60W 2520/28* (2013.01); *B60W 2530/10* (2013.01); *B60W 2530/20* (2013.01); *B60W 2540/10* (2013.01); *B60W 2550/302* (2013.01); *B60W 2550/306* (2013.01); *B60W 2550/308* (2013.01); *B60W 2550/406* (2013.01); *B60W 2550/408* (2013.01); *B60W 2710/0605* (2013.01); *B60W 2710/0627* (2013.01); *B60W 2710/0661* (2013.01); *B60W 2710/0666* (2013.01); *B60W 2710/1005* (2013.01); *B60W 2710/20* (2013.01); *B60W 2710/22* (2013.01); *G01S 19/13* (2013.01); *G05D 2201/0213* (2013.01); *H04L 67/12* (2013.01); *H04W 4/46* (2018.02); *H04W 84/005* (2013.01)

(56) References Cited

U.S. PATENT DOCUMENTS

| | | |
|---|---|---|
| 5,166,881 A | 11/1992 | Akasu |
| 5,295,551 A | 3/1994 | Sukonick |
| 5,331,561 A | 7/1994 | Barrett et al. |
| 5,572,449 A | 11/1996 | Ting et al. |
| 5,633,456 A | 5/1997 | Stander |
| 5,680,122 A | 10/1997 | Mio |
| 5,777,451 A * | 7/1998 | Kobayashi .............. B61L 23/34 180/169 |
| 5,781,119 A * | 7/1998 | Yamashita ............. G05D 1/024 180/168 |
| 5,815,825 A * | 9/1998 | Tachibana ............. G05D 1/024 180/169 |
| 5,880,958 A | 3/1999 | Helms et al. |
| 6,032,097 A | 2/2000 | Iihoshi et al. |
| 6,125,321 A | 9/2000 | Tabata et al. |
| 6,128,559 A * | 10/2000 | Saitou ...................... B61L 23/34 340/436 |
| 6,188,950 B1 | 2/2001 | Tsutsumi et al. |
| 6,265,990 B1 | 7/2001 | Isogai et al. |
| 6,285,929 B1 * | 9/2001 | Hashimoto ............ G05D 1/024 180/168 |
| 6,345,603 B1 | 2/2002 | Abboud et al. |
| 6,356,820 B1 | 3/2002 | Hashimoto et al. |
| 6,397,149 B1 * | 5/2002 | Hashimoto .......... G05D 1/0297 455/99 |
| 6,418,370 B1 | 7/2002 | Isogai et al. |
| 6,484,078 B1 | 11/2002 | Kageyama |
| 6,510,381 B2 | 1/2003 | Grounds et al. |
| 6,604,038 B1 | 8/2003 | Lesesky et al. |
| 6,633,006 B1 | 10/2003 | Wolf et al. |
| 6,765,495 B1 | 7/2004 | Dunning et al. |
| 6,879,910 B2 | 4/2005 | Shike et al. |
| 6,898,585 B2 * | 5/2005 | Benson ...................... G05B 9/02 700/50 |
| 6,963,795 B2 | 11/2005 | Haissig et al. |
| 6,975,246 B1 * | 12/2005 | Trudeau .................... B60T 7/22 180/167 |
| 7,286,825 B2 | 10/2007 | Shishido et al. |
| 7,460,951 B2 * | 12/2008 | Altan ...................... G01S 13/726 340/903 |
| 7,554,435 B2 * | 6/2009 | Tengler ...................... B60Q 1/44 340/425.5 |
| 7,593,811 B2 | 9/2009 | Schmidt et al. |
| 7,596,811 B2 | 9/2009 | Schmidt et al. |
| 7,729,823 B2 | 6/2010 | Ruoppolo |
| 7,782,227 B2 * | 8/2010 | Boss ....................... G08G 1/162 340/902 |
| 7,831,345 B2 | 11/2010 | Heino et al. |
| 7,894,982 B2 | 2/2011 | Reeser et al. |
| 8,026,833 B2 | 9/2011 | Villaume et al. |
| 8,073,574 B2 | 12/2011 | Yamamoto et al. |
| 8,116,921 B2 | 2/2012 | Ferrin et al. |
| 8,139,109 B2 | 3/2012 | Broggi et al. |
| 8,224,551 B2 | 7/2012 | Grolle et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 * | 1/2013 | Mudalige .................. G08G 1/22 340/435 |
| 8,354,955 B2 * | 1/2013 | Miyake .................. G01S 7/2926 342/104 |
| 8,442,735 B2 | 5/2013 | Hrovat et al. |
| 8,538,656 B2 | 9/2013 | Yamashiro |
| 8,554,468 B1 | 10/2013 | Bullock |
| 8,618,922 B2 * | 12/2013 | Debouk .................. B60W 50/038 340/439 |
| 8,620,517 B2 | 12/2013 | Caveney et al. |
| 8,660,779 B2 | 2/2014 | Shida |
| 8,666,587 B2 | 3/2014 | Anderson |

(56) References Cited

U.S. PATENT DOCUMENTS

| | | |
|---|---|---|
| 8,676,466 B2 | 3/2014 | Mudalige |
| 8,682,511 B2 | 3/2014 | Andreasson |
| 8,688,349 B2 | 4/2014 | Grolle et al. |
| 8,738,238 B2 | 5/2014 | Rekow |
| 8,744,666 B2* | 6/2014 | Switkes .................. G08G 1/166 |
| | | 701/28 |
| 8,775,060 B2 | 7/2014 | Solyom et al. |
| 8,798,907 B2 | 8/2014 | Shida |
| 8,947,531 B2 | 2/2015 | Fischer et al. |
| 8,948,995 B2 | 2/2015 | Pandita et al. |
| 8,954,272 B2* | 2/2015 | Adam .................. G01S 13/726 |
| | | 701/519 |
| 8,970,401 B2* | 3/2015 | Molander .............. G01S 11/12 |
| | | 340/961 |
| 8,992,391 B2 | 3/2015 | Seastrom et al. |
| 9,037,389 B2 | 5/2015 | You |
| 9,079,587 B1 | 7/2015 | Rupp et al. |
| 9,141,112 B1 | 9/2015 | Loo et al. |
| 9,145,137 B2 | 9/2015 | Doi et al. |
| 9,174,672 B2* | 11/2015 | Zeng ...................... G05D 1/024 |
| 9,221,396 B1 | 12/2015 | Zhu et al. |
| 9,224,300 B2 | 12/2015 | Lee et al. |
| 9,355,423 B1 | 5/2016 | Slusar |
| 9,367,065 B2 | 6/2016 | Dolgov et al. |
| 9,396,661 B2 | 7/2016 | Okamoto |
| 9,423,794 B2 | 8/2016 | Lind et al. |
| 9,449,258 B1 | 9/2016 | Palacio et al. |
| 9,460,622 B1 | 10/2016 | Ferguson et al. |
| 9,494,944 B2 | 11/2016 | Alam et al. |
| 9,582,006 B2 | 2/2017 | Switkes et al. |
| 9,598,078 B2* | 3/2017 | Moran .................. B60W 30/09 |
| 9,613,466 B2 | 4/2017 | Bullock |
| 9,616,743 B1 | 4/2017 | Mays et al. |
| 9,632,507 B1* | 4/2017 | Korn ...................... G05D 1/0293 |
| 9,645,579 B2 | 5/2017 | Switkes et al. |
| 9,665,102 B2* | 5/2017 | Switkes ................ G08G 1/166 |
| 9,721,474 B2* | 8/2017 | Eskilson ................ A61B 5/18 |
| 9,771,070 B2* | 9/2017 | Zagorski ............ B60W 30/09 |
| 9,799,224 B2 | 10/2017 | Okamoto |
| 9,823,166 B2* | 11/2017 | Dudar .................. B60W 40/02 |
| 9,852,475 B1* | 12/2017 | Konrardy ............... H04W 4/90 |
| 9,878,257 B2 | 1/2018 | Wunsche, III et al. |
| 9,884,631 B2* | 2/2018 | James .................. B60W 50/082 |
| 9,927,816 B2 | 3/2018 | Li et al. |
| 9,928,746 B1 | 3/2018 | MacNeille et al. |
| 9,940,840 B1 | 4/2018 | Schubert et al. |
| 10,013,877 B2 | 7/2018 | Lu et al. |
| 10,017,039 B1 | 7/2018 | Colavincenzo |
| 10,017,179 B2 | 7/2018 | Alden et al. |
| 10,027,024 B2 | 7/2018 | Powell |
| 10,031,522 B2 | 7/2018 | Moran et al. |
| 2001/0001138 A1 | 5/2001 | Zhu et al. |
| 2002/0077748 A1* | 6/2002 | Nakano .............. G01C 21/3492 |
| | | 701/410 |
| 2002/0135507 A1 | 9/2002 | Winner et al. |
| 2002/0152015 A1 | 10/2002 | Seto |
| 2002/0198632 A1* | 12/2002 | Breed .................. B60N 2/2863 |
| | | 701/1 |
| 2003/0094858 A1 | 5/2003 | Shiue et al. |
| 2003/0225517 A1 | 12/2003 | Schiffann |
| 2004/0046448 A1 | 3/2004 | Brown |
| 2004/0078133 A1 | 4/2004 | Miller et al. |
| 2004/0140143 A1 | 7/2004 | Saeki |
| 2004/0245853 A1* | 12/2004 | Odagawa ................ G08G 1/162 |
| | | 303/191 |
| 2004/0252863 A1* | 12/2004 | Chang ................ G06K 9/3241 |
| | | 382/104 |
| 2006/0074557 A1 | 4/2006 | Mulligan et al. |
| 2006/0095195 A1* | 5/2006 | Nishimura .......... B60W 30/025 |
| | | 701/96 |
| 2006/0106534 A1 | 5/2006 | Kawamata et al. |
| 2006/0161341 A1* | 7/2006 | Haegebarth ............ G08G 1/20 |
| | | 701/117 |
| 2006/0195250 A1 | 8/2006 | Kawaguchi |
| 2006/0229804 A1* | 10/2006 | Schmidt .............. G05D 1/0278 |
| | | 701/466 |
| 2007/0027614 A1 | 2/2007 | Reeser et al. |
| 2007/0032245 A1 | 2/2007 | Alapuranen |
| 2007/0043502 A1* | 2/2007 | Mudalige ................ B60T 7/22 |
| | | 701/301 |
| 2007/0060045 A1 | 3/2007 | Prautzsch |
| 2007/0210953 A1* | 9/2007 | Abraham ............ G08G 5/0069 |
| | | 342/29 |
| 2007/0213915 A1 | 9/2007 | Tange |
| 2007/0233337 A1* | 10/2007 | Plishner ............... G05D 1/0295 |
| | | 701/23 |
| 2007/0256481 A1 | 11/2007 | Nishiyama et al. |
| 2007/0276597 A1 | 11/2007 | Kato et al. |
| 2008/0009985 A1* | 1/2008 | Plishner ............... G05D 1/0295 |
| | | 701/23 |
| 2008/0033649 A1* | 2/2008 | Hasegawa ............ G06K 9/4619 |
| | | 701/301 |
| 2008/0059007 A1* | 3/2008 | Whittaker ............ G05D 1/0274 |
| | | 701/2 |
| 2008/0119965 A1* | 5/2008 | McCrary .................. B60C 7/00 |
| | | 701/2 |
| 2008/0122652 A1* | 5/2008 | Tengler .................... B60Q 1/44 |
| | | 340/902 |
| 2008/0249667 A1 | 10/2008 | Horvitz et al. |
| 2008/0255722 A1 | 10/2008 | McClellan et al. |
| 2008/0258890 A1 | 10/2008 | Follmer et al. |
| 2009/0012666 A1 | 1/2009 | Simpson et al. |
| 2009/0051510 A1 | 2/2009 | Follmer et al. |
| 2009/0062974 A1* | 3/2009 | Tamamoto ........... G05D 1/0295 |
| | | 701/25 |
| 2009/0079839 A1* | 3/2009 | Fischer .................. G01S 7/003 |
| | | 348/218.1 |
| 2009/0118889 A1 | 5/2009 | Heino et al. |
| 2009/0157461 A1 | 6/2009 | Wright et al. |
| 2009/0164082 A1 | 6/2009 | Kobayashi et al. |
| 2009/0198427 A1* | 8/2009 | Christopher Jackson .................. |
| | | B60T 7/122 |
| | | 701/70 |
| 2009/0222186 A1 | 9/2009 | Jensen |
| 2009/0271083 A1 | 10/2009 | Kumar |
| 2009/0286648 A1 | 11/2009 | Vesenjak |
| 2009/0287412 A1* | 11/2009 | Menzel .................. G01C 21/36 |
| | | 701/117 |
| 2009/0326799 A1 | 12/2009 | Crook |
| 2010/0044998 A1 | 2/2010 | Franchineau |
| 2010/0045507 A1* | 2/2010 | Yamano ...................... G01S 3/74 |
| | | 342/70 |
| 2010/0049374 A1* | 2/2010 | Ferrin .................. G05D 1/0227 |
| | | 701/1 |
| 2010/0094509 A1* | 4/2010 | Luke .................... B60W 40/02 |
| | | 701/45 |
| 2010/0106356 A1* | 4/2010 | Trepagnier ............ G01S 17/023 |
| | | 701/25 |
| 2010/0191449 A1 | 7/2010 | Iwamoto |
| 2010/0194638 A1 | 8/2010 | Rivard |
| 2010/0256835 A1 | 10/2010 | Mudalige |
| 2010/0256836 A1 | 10/2010 | Mudalige |
| 2010/0256852 A1* | 10/2010 | Mudalige .............. G08G 1/163 |
| | | 701/24 |
| 2010/0332101 A1 | 12/2010 | Braunberger et al. |
| 2011/0010022 A1 | 1/2011 | Beavin |
| 2011/0083011 A1 | 4/2011 | DiCrescenzo |
| 2011/0093177 A1 | 4/2011 | Horn |
| 2011/0112730 A1 | 5/2011 | Rekow |
| 2011/0118967 A1* | 5/2011 | Tsuda .................... B60W 30/10 |
| | | 701/117 |
| 2011/0184596 A1 | 7/2011 | Andreasson |
| 2011/0184605 A1* | 7/2011 | Neff ...................... G05D 1/0231 |
| | | 701/25 |
| 2011/0210872 A1* | 9/2011 | Molander .................. G01S 5/16 |
| | | 340/961 |
| 2011/0270514 A1* | 11/2011 | Shida .................... B60W 30/16 |
| | | 701/117 |
| 2011/0270520 A1 | 11/2011 | Kronenberg |
| 2011/0274523 A1 | 11/2011 | Petalas |
| 2011/0301779 A1 | 12/2011 | Shida |

(56) References Cited

U.S. PATENT DOCUMENTS

| | | |
|---|---|---|
| 2012/0061154 A1 | 3/2012 | Pfister |
| 2012/0089294 A1* | 4/2012 | Fehse .................. B60W 50/12 701/25 |
| 2012/0105270 A1 | 5/2012 | Miyake et al. |
| 2012/0109421 A1 | 5/2012 | Scarola |
| 2012/0109610 A1* | 5/2012 | Anderson ............ B60W 30/09 703/8 |
| 2012/0139549 A1* | 6/2012 | Sufrin-Disler ........ H02J 7/0016 324/433 |
| 2012/0166057 A1 | 6/2012 | Amato et al. |
| 2012/0206282 A1* | 8/2012 | Gorbold ............ G01R 31/3167 341/120 |
| 2012/0221235 A1 | 8/2012 | Prudhomme-Lacroix et al. |
| 2012/0226965 A1* | 9/2012 | Hammerschmidt .................... H03M 13/093 714/807 |
| 2012/0252415 A1* | 10/2012 | Menzel ................ H04L 63/083 455/411 |
| 2012/0259516 A1 | 10/2012 | Grolle et al. |
| 2012/0259538 A1* | 10/2012 | Oexmann ............ G08G 1/163 701/301 |
| 2012/0323474 A1 | 12/2012 | Breed et al. |
| 2013/0015984 A1* | 1/2013 | Yamashiro ............ G08G 1/22 340/988 |
| 2013/0018766 A1 | 1/2013 | Christman |
| 2013/0024084 A1 | 1/2013 | Yamashiro |
| 2013/0030606 A1* | 1/2013 | Mudalige ............ G08G 1/22 701/2 |
| 2013/0030657 A1* | 1/2013 | Chatterjee ............ B60W 50/08 701/46 |
| 2013/0041567 A1* | 2/2013 | Yamashiro ............ B60T 7/22 701/96 |
| 2013/0041576 A1* | 2/2013 | Switkes ............ G08G 1/166 701/123 |
| 2013/0079953 A1* | 3/2013 | Kumabe ............ G05D 1/024 701/2 |
| 2013/0080040 A1* | 3/2013 | Kumabe ............ G05D 1/0293 701/117 |
| 2013/0080041 A1* | 3/2013 | Kumabe ............ G05D 1/024 701/117 |
| 2013/0090803 A1 | 4/2013 | Stahlin et al. |
| 2013/0116861 A1* | 5/2013 | Nemoto ............ B60W 30/16 701/2 |
| 2013/0124064 A1* | 5/2013 | Nemoto ............ B60K 31/0058 701/96 |
| 2013/0144465 A1 | 6/2013 | Shida |
| 2013/0151058 A1* | 6/2013 | Zagorski ............ B60W 30/09 701/23 |
| 2013/0158852 A1 | 6/2013 | Stahlin et al. |
| 2013/0165146 A1 | 6/2013 | Stahlins et al. |
| 2013/0173114 A1 | 7/2013 | Pillai |
| 2013/0211624 A1* | 8/2013 | Lind .................... G05D 1/0278 701/2 |
| 2013/0218365 A1* | 8/2013 | Caveney ............ G05D 1/0295 701/1 |
| 2013/0231820 A1 | 9/2013 | Solyom et al. |
| 2013/0317676 A1* | 11/2013 | Cooper .................... B61L 3/121 701/20 |
| 2013/0325306 A1* | 12/2013 | Caveney ............ B60W 30/0953 701/117 |
| 2014/0005875 A1* | 1/2014 | Hartmann ............ B60W 10/06 701/23 |
| 2014/0005906 A1* | 1/2014 | Pandita ............ B60W 30/17 701/96 |
| 2014/0019031 A1* | 1/2014 | Solyom ............ G08G 1/22 701/117 |
| 2014/0067220 A1 | 3/2014 | Seiler |
| 2014/0100734 A1* | 4/2014 | Yamashiro ............ G08G 1/22 701/23 |
| 2014/0107867 A1* | 4/2014 | Yamashiro ............ G08G 1/22 701/2 |
| 2014/0129075 A1* | 5/2014 | Carleton ............ B60W 30/00 701/27 |
| 2014/0142799 A1* | 5/2014 | Ferguson .................. G05D 1/00 701/23 |
| 2014/0142801 A1* | 5/2014 | Shah ...................... H04L 43/065 701/32.7 |
| 2014/0145838 A1* | 5/2014 | Tuukkanen ............ B60Q 1/085 340/436 |
| 2014/0148994 A1 | 5/2014 | Ando |
| 2014/0156118 A1 | 6/2014 | Wiemeyer et al. |
| 2014/0172265 A1* | 6/2014 | Funabashi ................ G08G 1/22 701/96 |
| 2014/0197967 A1 | 7/2014 | Modica et al. |
| 2014/0210645 A1 | 7/2014 | Sharma |
| 2014/0214255 A1 | 7/2014 | Dolgov et al. |
| 2014/0222278 A1* | 8/2014 | Fujita .................... B60W 30/09 701/25 |
| 2014/0236449 A1* | 8/2014 | Horn .................... B60W 30/16 701/96 |
| 2014/0244144 A1 | 8/2014 | You |
| 2014/0277608 A1 | 9/2014 | Debouk et al. |
| 2014/0297063 A1 | 10/2014 | Shida |
| 2014/0303870 A1 | 10/2014 | Switkes et al. |
| 2014/0306799 A1* | 10/2014 | Ricci .................... H04W 4/21 340/5.83 |
| 2014/0306826 A1* | 10/2014 | Ricci .................... H04W 4/21 340/573.1 |
| 2014/0309836 A1 | 10/2014 | Ollis |
| 2014/0316671 A1* | 10/2014 | Okamoto .................. G08G 1/22 701/96 |
| 2014/0316865 A1* | 10/2014 | Okamoto .................. G08G 1/22 705/14.1 |
| 2014/0324339 A1 | 10/2014 | Adam et al. |
| 2014/0350793 A1 | 11/2014 | Schrabler et al. |
| 2014/0350835 A1* | 11/2014 | Martin ...................... G08G 9/02 701/301 |
| 2015/0012204 A1* | 1/2015 | Breuer ...................... B60T 7/22 701/96 |
| 2015/0015267 A1* | 1/2015 | Mueller ............ H04B 15/005 324/426 |
| 2015/0025731 A1* | 1/2015 | Uehara .................... G05D 1/00 701/23 |
| 2015/0061492 A1 | 3/2015 | Braunberger |
| 2015/0100192 A1* | 4/2015 | Lee ............ G08G 1/22 701/23 |
| 2015/0120137 A1* | 4/2015 | Zeng ...................... G05D 1/024 701/41 |
| 2015/0151737 A1* | 6/2015 | Birch .................... B60W 20/15 701/22 |
| 2015/0153733 A1 | 6/2015 | Ohmura et al. |
| 2015/0154871 A1 | 6/2015 | Rothoff et al. |
| 2015/0161894 A1* | 6/2015 | Duncan ................ G08G 1/163 701/1 |
| 2015/0178998 A1 | 6/2015 | Attard et al. |
| 2015/0262481 A1 | 9/2015 | Selin |
| 2015/0279122 A1 | 10/2015 | Lorenzen |
| 2015/0296019 A1 | 10/2015 | Onishi et al. |
| 2015/0314790 A1 | 11/2015 | Deragarden et al. |
| 2015/0334371 A1* | 11/2015 | Galera ............ H04N 13/0203 348/46 |
| 2015/0356635 A1 | 12/2015 | Thurston |
| 2015/0378722 A1* | 12/2015 | Zuniga-Hernandez ...................... G06F 8/60 717/103 |
| 2016/0009288 A1 | 1/2016 | Yu |
| 2016/0019782 A1 | 1/2016 | Alam et al. |
| 2016/0026187 A1 | 1/2016 | Alam et al. |
| 2016/0039412 A1 | 2/2016 | Stahlin |
| 2016/0054735 A1 | 2/2016 | Switkes et al. |
| 2016/0170021 A1 | 6/2016 | Rashid et al. |
| 2016/0194014 A1 | 7/2016 | Rajendran |
| 2016/0198303 A1 | 7/2016 | Grotendorst et al. |
| 2016/0267796 A1 | 9/2016 | Hiroma et al. |
| 2016/0272207 A1 | 9/2016 | Dolgov et al. |
| 2016/0297447 A1 | 10/2016 | Suzuki |
| 2016/0300186 A1 | 10/2016 | Scharaswak et al. |
| 2016/0359741 A1 | 12/2016 | Cooper et al. |

(56) References Cited

U.S. PATENT DOCUMENTS

| | | | |
|---|---|---|---|
| 2016/0373261 A1* | 12/2016 | Tschache | G06F 13/36 |
| 2016/0375732 A1* | 12/2016 | Lazar, II | G01P 7/00 |
| | | | 73/115.08 |
| 2017/0011633 A1 | 1/2017 | Boegel | |
| 2017/0058477 A1 | 3/2017 | Niroumand | |
| 2017/0069203 A1 | 3/2017 | Sharma | |
| 2017/0083844 A1 | 3/2017 | Baker et al. | |
| 2017/0115666 A1 | 4/2017 | Kolhouse et al. | |
| 2017/0122841 A1 | 5/2017 | Dudar et al. | |
| 2017/0132299 A1 | 5/2017 | Fox et al. | |
| 2017/0146801 A1* | 5/2017 | Stempora | G06Q 40/08 |
| 2017/0168503 A1 | 6/2017 | Amla et al. | |
| 2017/0178536 A1 | 6/2017 | Manci et al. | |
| 2017/0186327 A1 | 6/2017 | Uysal et al. | |
| 2017/0197544 A1 | 7/2017 | Wang et al. | |
| 2017/0197615 A1 | 7/2017 | Elie et al. | |
| 2017/0212511 A1 | 7/2017 | Ferreira et al. | |
| 2017/0227972 A1 | 8/2017 | Sabau | |
| 2017/0235316 A1 | 8/2017 | Shattil | |
| 2017/0238321 A1 | 8/2017 | Sartori et al. | |
| 2017/0242095 A1* | 8/2017 | Schuh | B60W 30/16 |
| 2017/0261997 A1 | 9/2017 | Switkes et al. | |
| 2017/0289864 A1 | 10/2017 | Narasimha et al. | |
| 2017/0293296 A1 | 10/2017 | Stenneth et al. | |
| 2017/0308097 A1 | 10/2017 | Switkes et al. | |
| 2017/0309187 A1 | 10/2017 | Lin | |
| 2017/0323244 A1 | 11/2017 | Rani et al. | |
| 2017/0329348 A1 | 11/2017 | Li et al. | |
| 2017/0344023 A1 | 11/2017 | Laubinger et al. | |
| 2017/0349058 A1 | 12/2017 | Bernier et al. | |
| 2017/0349176 A1 | 12/2017 | Alden et al. | |
| 2017/0361762 A1 | 12/2017 | Wunsche, III et al. | |
| 2018/0006365 A1 | 1/2018 | Powell | |
| 2018/0018605 A1 | 1/2018 | Light-Holets et al. | |
| 2018/0032072 A1 | 2/2018 | Hoye | |
| 2018/0047293 A1 | 2/2018 | Dudar | |
| 2018/0050697 A1 | 2/2018 | Kuszmaul et al. | |
| 2018/0082590 A1 | 3/2018 | MacNeille et al. | |
| 2018/0082591 A1 | 3/2018 | Pandy | |
| 2018/0084511 A1 | 3/2018 | Wu et al. | |
| 2018/0111611 A1 | 4/2018 | MacNeille et al. | |
| 2018/0120861 A1 | 5/2018 | Saxena et al. | |
| 2018/0137763 A1 | 5/2018 | Deragarden et al. | |
| 2018/0188725 A1 | 7/2018 | Cremona et al. | |
| 2018/0188745 A1 | 7/2018 | Pilkington | |
| 2018/0188746 A1 | 7/2018 | Lesher et al. | |
| 2018/0190119 A1 | 7/2018 | Miller, Jr. et al. | |
| 2018/0190128 A1 | 7/2018 | Saigusa | |
| 2018/0210461 A1 | 7/2018 | Cremona et al. | |

FOREIGN PATENT DOCUMENTS

| | | | |
|---|---|---|---|
| EP | 0 982 173 | 3/2000 | |
| EP | 0 991 046 | 3/2005 | |
| EP | 1 975 901 | 3/2009 | |
| EP | 2 390 744 | 11/2011 | |
| GB | 2540039 | 1/1917 | |
| GB | 2551248 | 12/1917 | |
| GB | 2557001 | 6/1918 | |
| GB | 2557434 | 6/1918 | |
| GB | 2558051 | 7/1918 | |
| JP | 2017-215681 | 12/1917 | |
| JP | 05-170008 | 7/1993 | |
| JP | 2995970 | 12/1999 | |
| JP | 2010-030525 | 2/2010 | |
| JP | 2014-056483 | 3/2012 | |
| JP | 5141849 | 2/2013 | |
| WO | WO 2016/065055 | 4/1916 | |
| WO | WO 2016/087555 | 6/1916 | |
| WO | WO 2016/087901 | 6/1916 | |
| WO | WO 2016/134610 | 9/1916 | |
| WO | WO 2016/134770 | 9/1916 | |
| WO | WO 2016/135207 | 9/1916 | |
| WO | WO 2016/182489 | 11/1916 | |
| WO | WO 2016/201435 | 12/1916 | |
| WO | WO 2017/048165 | 3/1917 | |
| WO | WO 2017/070714 | 4/1917 | |
| WO | WO 2017/148113 | 9/1917 | |
| WO | WO 2017/164792 | 9/1917 | |
| WO | WO 2017/179193 | 10/1917 | |
| WO | WO 2017/184062 | 10/1917 | |
| WO | WO 2017/184063 | 10/1917 | |
| WO | WO 2017/196165 | 11/1917 | |
| WO | WO 2017/200433 | 11/1917 | |
| WO | WO 2017/204712 | 11/1917 | |
| WO | WO 2017/209124 | 12/1917 | |
| WO | WO 2017/209666 | 12/1917 | |
| WO | WO 2018/000386 | 1/1918 | |
| WO | WO 2018/035145 | 2/1918 | |
| WO | WO 2018/043519 | 3/1918 | |
| WO | WO 2018/043520 | 3/1918 | |
| WO | WO 2018/043753 | 3/1918 | |
| WO | WO 2018/054520 | 3/1918 | |
| WO | WO 2018/106774 | 6/1918 | |
| WO | WO 2018/111177 | 6/1918 | |
| WO | WO 2018/135630 | 7/1918 | |
| WO | WO 2018/137754 | 8/1918 | |
| WO | WO 2004/077378 | 9/2004 | |
| WO | WO 2009/024563 | 2/2009 | |
| WO | WO 2009/043643 | 4/2009 | |
| WO | WO 2010/098554 | 9/2010 | |
| WO | WO 2011/125193 | 10/2011 | |
| WO | WO 2013/006826 | 1/2013 | |
| WO | WO-2013006826 A2 * | 1/2013 | B60W 10/06 |
| WO | WO 2013/165297 | 4/2013 | |
| WO | WO 2013/147682 | 10/2013 | |
| WO | WO 2013/187835 | 12/2013 | |
| WO | WO 2014/062118 | 4/2014 | |
| WO | WO 2014/092628 | 6/2014 | |
| WO | WO 2014/133425 | 9/2014 | |
| WO | WO 2014/137270 | 9/2014 | |
| WO | WO 2014/137271 | 9/2014 | |
| WO | WO 2014/145918 | 9/2014 | |
| WO | WO 2015/047174 | 4/2015 | |
| WO | WO 2015/047175 | 4/2015 | |
| WO | WO 2015/047176 | 4/2015 | |
| WO | WO 2015/047177 | 4/2015 | |
| WO | WO 2015/047178 | 4/2015 | |
| WO | WO 2015/047179 | 4/2015 | |
| WO | WO 2015/047181 | 4/2015 | |
| WO | WO 2015/047182 | 4/2015 | |
| WO | WO 2015/156731 | 10/2015 | |

OTHER PUBLICATIONS

Klaus et al., U.S. Appl. No. 15/860,333, filed Jan. 2, 2018.
Price et al., U.S. Appl. No. 15/860, 450, filed Jan. 2, 2018.
International Search Report and Written Opinion dated Dec. 7, 2017, from International Application No. PCT/US2017/047825.
Switkes et al., International Application No. PCT/US17/47771, filed Aug. 21, 2017.
Browand et al., "Fuel Saving Achieved in the Field Test of Two Tandem Trucks", California PATH Research Report, UCB-ITS-PRR-2001-20, Jun. 2004.
Shladover et al., "Demonstration of Automated Heavy-Duty Vehicles", California PATH Research Report, UCB-ITS-PRR-2005-23, Jun. 2005.
Shladover et al., "Development and Evaluation of Selected Mobility Applications for VII (a.k.a. IntelliDrive)", http://slideplayer.com/slide/6981587/, Jul. 1, 2009.
Tsugawa, "An Overview on an Automated Truck Platoon Within the Energy ITS Project", $7^{th}$ IFAC Symposium on Advances in Automotive Control, Tokyo, Japan, Sep. 4-7, 2013.
Sugimachi et al., "Development of Autonomous Platooning System for Heavy-Duty Trucks", $7^{th}$ IFAC Symposium on Advances in Automotive Control, Tokyo, Japan, Sep. 4-7, 2013.
Sheikholeslam et al., "Longitudinal Control of a Platoon of Vehicles; III; Nonlinear Model", Program on Advanced Technology for the Highway, Institute of Transportation Studies, University of California at Berkeley, Apr. 1, 1990.

(56) References Cited

OTHER PUBLICATIONS

Sheikholeslam et al., "Longitudinal Control of a Platoon of Vehicles", Department of Electrical Engineering and Computer Science, University of California, Berkeley, May 1990.
Sheikholeslam et al., "A System Level Study of the Longitudinal Control of a Platoon of Vehicles", Department of Electrical Engineering and Computer Science, University of California, Berkeley, Jun. 1992.
Porche et al., "Real Time Task Manager for Communicationsand Control in Multicar Platoons", Department of Electrical Engineering and Computer Science, University of California, Berkeley, Jun. 1992.
Gerdes et al., "Brake System Requirements for Platooning on an Automated Highway", Department of Mechanical Engineering, University of California, Berkeley, Jun. 1995.
Zabat et al., "The Aerodynamic Performance of Platoons: Final Report", California PATH Research Report, California PATH Program, Institute of Transportation Studies, University of California, Berkeley, Oct. 1995.
Gerdes et al., "Vehicle Speed and Spacing Control via Coordinated Throttle and Brake Actuation", Department of Mechanical Engineering, University of California, Berkeley, Sep. 1997.
Alvarez et al., "Safe Platooning in Automated Highway Systems Part I: Safety Regions Design", Department of Mechanical Engineering, University of California, Berkeley, 1999.
Alvarez et al., "Safe Platooning in Automated Highway Systems Part II: Velocity Tracking Controller", Department of Mechanical Engineering, University of California, Berkeley, 1999.
Michaelian et al., "Field Experiments Demonstrate Fuel Savings for Close-Following", University of Southern California, California PATH Research Report, Sep. 2000.
Simon Halle, "Automated Highway Systems: Platoons of Vehicles Viewed as a Multiagent System", University of Quebec, Jun. 2005.
Friedrichs et al., "A Generic Software Architecture for a Driver Information System to Organize and Operate Truck Platoons", https://www.researchgate.net/publication/256195846, May 2008.
Meisen et al., "A Data-Mining Technique for the Planning and Organization of Truck Platoons", https://www.researchgate.net/publication/256195756, May 2008.
Ramakers et al., "Electronically Coupled Truck platoons on German Highways", IEEE International Conference on Systems, Man, and Cybernetics, San Antonio, TX, Oct. 2009.
Kunze et al., "Organization and Operation of Electronically Coupled Truck Platoons on German Highways", RWTH Aachen University, Center for Learning and Knowledge Management and Department of Information Management in Mechanical Engineering, Aachen, Germany, Dec. 2009.
Kunze et al., "Efficient Organization of Truck Platoons by Means of Data Mining", $7^{th}$ International Conference on Informatics in Control, Automation and Robotics, RWTH Aachen University, Center for Learning and Knowledge Management and Department of Information Management in Mechanical Engineering, Aachen, Germany, Jan. 2010.
Jacobson et al., "Functional Safety in Systems of Road Vehicles", SP Technical Research Institute of Sweden, Jul. 2010.
Nowakowski et al., "Cooperative Adaptive Cruise Control: Testing Driver's Choices of Following Distances", California PATH Program, Institute of Transportation Studies, University of California, Berkeley, Jan. 2011.
Tsugawa et al., "An Automated Truck Platoon for Energy Saving", IEEE/RSJ International Conference on Intelligent Robots and Systems, San Francisco, CA, Sep. 25-30, 2011.
Desjardins et al., "Cooperative Adaptive Cruise Control: A Reinforcement Learning Approach", IEEE Transactions on Intelligent Transportation Systems, vol. 12, No. 4, Dec. 2011.
Larson et al., "Coordinated Route Optimization for Heavy-duty Vehicle Platoons", Proceedings of the $16^{th}$ International IEEE Annual Conference on Intelligent Transportation Systems (ITSC 2013), The Hague, The Netherlands, Oct. 6-9, 2013.

Aoki, "Research and Development of Fully Automated Vehicles", ITS Research Division, Japan Automobile Research Institute, Tokyo, Japan, Nov. 2013.
Lu et al., "Automated Truck Platoon Control and Field Test, Road Vehicle Automation", https://www.researchgate.net/publication/266390502, Aug. 2014.
White Paper, "Automated Driving and Platooning Issues and Opportunities", ATA Technology and Maintenance Council Future Truck Program, Sep. 21, 2015.
Nowakowski et al., "Cooperative Adaptive Cruise Control (CACC) for Truck Platooning: Operational Concept Alternatives", California Path, California Partners for Advanced Transportation Technology, UC Berkeley, Mar. 2015.
Erlien, "Shared Vehicle Control Using Safe Driving Envelopes for Obstacle Avoidance and Stability", A Dissertation submitted to the Department of Mechanical Engineering and the Committee on Graduate Studies of Stanford University, Mar. 2015.
Shladover et al., "Cooperative Adaptive Cruise Control, Definitions and Operating Concepts", Transportation Research Record 2489, 2015.
Tsugawa et al., "A Review of Truck Platooning Projects for Energy Savings", IEEE Transactions on Intelligent Vehicles, vol. 1, No. 1, Mar. 2016.
Geiger et al., "Team AnnieWAY's Entry to the 2011 Grand Cooperative Driving Challenge", IEEE Transactions on Intelligent Transportation Systems, vol. 13, No. 3, Sep. 2012.
Bergenheim et al., "Vehicle-to-Vehicle Communication for a Platooning System", SP Technical Research Institute of Sweden, Procedia—Social and Behavioral Sciences vol. 48, 2012.
Bae et al., "Road Grade and Vehicle Parameter Estimation for Longitudinal Control Using GPS", 2001 IEEE Intelligent Transportation Systems Conference Proceedings, Oakland, CA, Aug. 25-29, 2001.
Holm, "Vehicle Mass and Road Grade Estimation Using Kalman Filter", MSc Thesis, Department of Electrical Engineering, Sweden, Aug. 2011.
Kidambi et al., "Methods in Vehicle Mass and Road Grade Estimation", SAE International, University of Michigan, Apr. 1, 2014.
Paulsson et al., "Vehicle Mass and Road Grade Estimation Using Recursive Least Squares", MSc Thesis, Lund University, 2016.
Montvey, et al., Priority Document associated with EP Application No. 03 100457.5., Feb. 25, 2003.
Alam et al., "An Experimental Study on the Fuel Reduction Potential of Heavy Duty Vehicle Platooning", 2010 $13^{th}$ International IEEE, Annual Conference on Intelligent Transportation Systems, Sep. 19-22, 2010.
"Automated Highway System: Milestone 2 Report, Task C2: Downselect System Configurations and Workshop #3" (National Automated Highway System Consortium, Troy, MI, Jun. 1997), 604 pages.
Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.
Shladover, Steven E. et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.
Shladover, Steven E. et al., "Development and Evaluation of Selected Mobility Applications for VII", California PATH Research Report UCB-ITS-PRR-2011-09, (U.C. Berkeley, Jun. 2011), 109 pages.
Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.
Roeth, Michael, "CR England Peloton Technology Platooning Test Nov. 2013", (North American Council on Freight Efficiency (NACFE.org), Fort Wayne, in, Dec. 2013);Retrieved Aug. 23, 2018 at https://nacfe.org/wp-content/uploads/2018/02/Peloton-NACFE-Fuel-Test-Report-120213.pdf.
Bevly, David et al. "Heavy Truck Cooperative Adaptive Cruise Control: Evaluation, Testing, and Stakeholder Engagement for Near Term Deployment: Phase One Final Report", Report to Federal

(56) References Cited

OTHER PUBLICATIONS

Highway Administration (Auburn University, Auburn, AL, Apr. 2015), 135 pages; Retrieved Aug. 23, 2018 at http://atri-online.org/wp-content/uploads/2015/05/DATPPhase1FinalReport.pdf.

Nowakowski, Christopher et al., "Heavy vehicle automation: Human factors lessons learned", Procedia Manufacturing vol. 3, Jul. 2015, pp. 2945-2952.

Zhao, Siyang et al., "Vehicle to Vehicle Communication and Platooning for EV with Wireless Sensor Network", SICE Annual Conference 2015, Hangzhou, China, Jul. 2015, pp. 1435-1440.

Brizzolara, Davide & Toth, Andrea, "The Emergence of Truck Platooning", Baltic Transport Journal, Mar. 2016, pp. 58-59.

\* cited by examiner

DISTRIBUTED SAFETY MONITORS FOR AUTOMATED VEHICLES

CROSS-REFERENCE TO RELATED APPLICATIONS

This application is a Continuation-in-Part of PCT Application No. PCT/US2017/047825 filed Aug. 21, 2017, which claims priority of U.S. Provisional Patent Application No. 62/377,970, filed on Aug. 22, 2016. Each of these priority applications is incorporated herein by reference in its entirety.

This application is also a Continuation-in-Part of U.S. application Ser. No. 15/607,316, filed May 26, 2017, which is a Continuation of U.S. application Ser. No. 14/292,583, filed on May 30, 2014 (now U.S. Pat. No. 9,665,102), which is a Divisional of U.S. application Ser. No. 13/542,622, filed on Jul. 5, 2012 (now U.S. Pat. No. 8,744,666), which claims priority of U.S. Provisional Application No. 61/505,076, filed on Jul. 6, 2011. U.S. application Ser. No. 14/292,583 is also a Divisional of U.S. application Ser. No. 13/542,627, filed on Jul. 5, 2012 (now U.S. Pat. No. 9,582,006), which claims priority of U.S. Provisional Application No. 61/505,076, filed on Jul. 6, 2011.

Additionally, this application is a Continuation-in-Part of U.S. application Ser. No. 15/589,124, filed on May 8, 2017, which is a continuation of U.S. application Ser. No. 14/855,044, filed on Sep. 15, 2015 (now U.S. Pat. No. 9,645,579) which is the U.S. national stage of PCT/US2014/030770 filed Mar. 17, 2014, which claims priority of U.S. Provisional Application No. 61/792,304 filed Mar. 15, 2013. U.S. application Ser. No. 15/589,124 is also a Continuation-in-Part of U.S. application Ser. No. 14/292,583 filed May 30, 2014 and claims priority of U.S. application Ser. Nos. 13/542,627 and 13/542,622.

Additionally, this application is a Continuation-in-Part of U.S. application Ser. No. 15/590,803, filed on May 9, 2017.

BACKGROUND

The present application relates generally to controllers, architectures, methods and systems for enabling vehicles to drive in a partially or fully autonomous mode and/or closely follow one another safely using automatic or partially automatic control.

In recent years significant strides have been made in the field of automated vehicle control. One segment of vehicle automation relates to connected vehicle control such as vehicular convoying systems that enable vehicles to follow closely together in a safe, efficient and convenient manner. Following closely behind another vehicle has the potential for significant fuel savings benefits, but is generally unsafe when done manually by the driver. One type of vehicle convoying system is sometimes referred to as vehicle platooning in which a second, and potentially additional, vehicle(s) is/are automatically or semi-automatically controlled to closely follow a lead vehicle in a safe manner.

The fuel efficiency advantages of platooning are particularly noticeable in fields such as the trucking industry in which long distances tend to be traveled at highway speeds. One of the on-going challenges of vehicle platooning and convoying systems is creating controller systems architectures that are cost effective, efficient and meet the stringent safety standards required for integration into mainstream road vehicles. Although existing gap control system architectures work well, there are continuing efforts to develop improved platoon controllers that provide safe and fuel efficient operation while delivering a comfortable user experience.

Beyond platooning there are a wide variety of partially or fully autonomous vehicle control application in which verified knowledge about what a second vehicle is doing can be very helpful in managing the partially or fully autonomous control of a host vehicle.

There are several industry and government standards relating to road vehicle safety. One well known international standard for classifying the functional safety of electrical and electronic system in road vehicles is the ASIL (Automotive Safety Integrity Level) standard defined by ISO 26262—Functional Safety for Road Vehicles standard. There are four safety integrity levels identified by the ASIL standard (ASIL-A, ASIL-B, ASIL-C and ASIL-D) with ASIL-A corresponding to the lowest level compliance requirements and ASIL-D representing the highest integrity requirements. Items having safety requirements that are not dictated by the standard are designed as QM (Quality Management).

Many ECUs, powertrain control modules (PCMs) and other controllers used in commercially available road vehicles are designed to expect that all commands that they receive come from ASIL compliant components that conform to a particular minimum ASIL level. Therefore, in some circumstances, it is desirable for control commands issued from the platoon controller to be ASIL rated or to meet other designated reliability criteria or standard. At the same time, some of the data (such as GPS position data) that is useful in platoon control does not itself have a reliability that can is suitable for ASIL rating. The present application describes platoon control system architectures that are particularly well suited for efficiently handling platooning control related tasks using information available from a variety of sources. When desired, the powertrain control commands ultimately issued by the control system may be ASIL rated.

SUMMARY

A variety of controllers, control architectures, systems, methods and algorithms are described for at least partially automatically controlling a host vehicle's based at least in part on information received from a second vehicle, as for example second vehicle sensor information. One such example is controlling the host vehicle's participation in a platoon.

In some embodiments, a vehicle control system includes at least two of (i) a connected vehicle or platoon controller, (ii) a gateway processor, and (iii) a vehicle interface controller. The connected vehicle/platoon controller is configured to determine vehicle control commands for at least partially automatically controlling the host vehicle based at least in part on current operating state information received from the second vehicle. The gateway processor coordinates communications between a host vehicle and the second vehicle/platoon partner. The vehicle interface controller manages communications between the connected vehicle/platoon controller and one or more host vehicle control units. The vehicle interface controller may also include a safety monitor that includes one or more safety monitoring algorithms that verify that connected vehicle/platooning operation is safe.

In some embodiments, the vehicle interface controller is at least ASIL-C compliant, whereas the connected vehicle/platoon controller and the gateway processor may be rated at a lower ASIL rating or QM rated under ISO 26262.

In some embodiments, the platoon controller is configured as a listener capable of receiving messages transmitted on at least one of the host vehicle's communication buses, but is not capable of transmitting messages onto any of the vehicle's control related communication buses. The vehicle interface controller is configured to transmit and receive messages on at least one of the vehicle communication buses (e.g. a CAN bus). The gateway processor is not coupled to any of the vehicle's control related buses and is not capable of receiving or transmitting any messages on any such vehicle buses.

In some embodiments, the control commands include torque and braking requests, and an interface between the connected vehicle/platoon controller and the vehicle interface controller includes the connected vehicle/platoon controller's torque and braking request. In some embodiments, the interface also includes verified partner state information indicative of at least a speed and a braking level of the second vehicle. The verified partner state information is preferably information sent and verified by a vehicle interface controller on the second vehicle and may be used in at least one of the safety monitoring algorithms implemented by the host vehicle's vehicle interface controller.

In some implementations, the verified partner state information received by the gateway processor from the second vehicle is passed to the connected vehicle/platoon controller without modification by the gateway processor. The connected vehicle/platoon controller in turn passes the verified state information to the vehicle interface controller without modification while also using that information in the determination of the vehicle control commands. In some embodiments, the verified partner state information is passed in data blocks that each include a checksum applied by the vehicle interface controller on the partner vehicle. The host vehicle's vehicle interface controller may then utilize the checksums to verify the integrity of the partner state information.

In some embodiments, the gateway processor also receives unverified partner state information such as GNSS position data from the partner vehicle. The unverified partner state information is passed to the connected vehicle/platoon controller and used by the connected vehicle/platoon controller in the determination of the vehicle control commands, but is not passed to the vehicle interface controller.

In various embodiments, the interface between a platoon controller and the vehicle interface controller may optionally further include one or more of (i) a platoon state indicator that indicates when the platoon controller believes its vehicle control commands should be directing operation of the host vehicle, (ii) a driver input indicator, (iii) a retarder command, (iv) a steering command.

In some embodiments, the connected vehicle/platoon controller is configured as a first system on module (SOM), the gateway processor is configured as second system on module (SOM), and the vehicle interface controller is implemented as a single packaged integrated circuit.

In some embodiments, the gateway processor receives host vehicle state information from the platoon controller and passes the host vehicle state information to the platoon partner, the host vehicle state information being indicative of at least a speed, a braking level and a position of the host vehicle. In some preferred embodiments the speed and braking level information is verified by the vehicle interface controller and is passed through the platoon controller and gateway processor without modification.

In some embodiments, the gateway processor is configured to wirelessly communicate with the platoon partner using a short-range, vehicle-to-vehicle wireless communications protocol, as for example the DSRC protocol. The gateway processor may also be configured to communicate with a networks operations center using cellular or satellite communications.

In some embodiments, a dedicated communications link directly connects the platoon controller to the gateway processor, with no other devices being coupled to the dedicated communications link. The connected vehicle/platoon controller and the gateway processor may be arranged to communicate over the dedicated communication link using a standard communications protocols such as Ethernet.

In some embodiments, the gateway processor also receives a video stream from the partner vehicle and forwards the video stream to a display mounted in the cabin so that the video stream can be viewed by the driver. The video stream, which may be a view of the road in front of the partner vehicle, is not passed to the platoon controller.

In some embodiments, the gateway processor includes a message logger and the connected vehicle/platoon controller does not have any logging capabilities. The message logger may be configured to log all of the partner state information and host state information passed through the gateway processor. In some embodiments, the platoon controller passes the torque and braking requests, and any other information that the system designers desire to be logged to the gateway controller for logging purposes.

In some embodiments, the vehicle control system comprises the aforementioned connected vehicle/platoon controller and vehicle interface controller with or without the described gateway processor.

In other embodiments, the vehicle control system comprises the aforementioned connected vehicle/platoon controller and gateway processor with or without the described vehicle interface controller.

In yet another aspect, a vehicle control system includes a vehicle controller configured to determine vehicle control commands for at least partially automatically controlling the host vehicle based at least in part on sensor information. The vehicle control commands are arranged to be directly or indirectly utilized by one or more host vehicle control units resident on the host vehicle. The vehicle control system also includes one or more safety monitoring algorithms that, during at least partially automated driving, verify that selected vehicle control commands received from the vehicle controller meet selected safety criteria. At least some of the safety algorithms utilize sensor data in the verification of the commands received from the vehicle controller. The sensor data used by the safety algorithms may come from the host vehicle and/or a second vehicle. In some embodiments, the vehicle controller may include any of the components described above.

BRIEF DESCRIPTION OF THE DRAWINGS

The invention and the advantages thereof, may best be understood by reference to the following description taken in conjunction with the accompanying drawings in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some case, one or more alternatives. It will be apparent to those skilled in the art that the invention can be practice without implementing all of the features disclosed herein.

The Applicant has proposed various vehicle platooning systems in which a second, and potentially additional, vehicle(s) is/are automatically, or semi-automatically, controlled to closely follow a lead vehicle in a safe manner. By way of example, U.S. application Ser. Nos. 15/605,456, 15/607,902; 13/542,622 and 13/542,627; U.S. Provisional Application Nos. 62/377,970 and 62/343,819; and PCT Application Nos. PCT/US2014/030770, PCT/US2016/049143 and PCT/US2016/060167 describe various vehicle platooning systems in which a trailing vehicle is at least partially automatically controlled to closely follow a designated lead vehicle. Each of these earlier applications is incorporated herein by reference.

One of the goals of platooning is typically to maintain a desired longitudinal distance between the platooning vehicles, which is frequently referred to herein as the "desired gap". That is, it is desirable for the trailing vehicle (e.g., a trailing truck) to maintain a designated gap relative to a specific vehicle (e.g., a lead truck). The vehicles involved in a platoon will typically have sophisticated control systems suitable for initiating a platoon, maintaining the gap under a wide variety of different driving conditions, and gracefully dissolving the platoon as appropriate.

Figure 1:
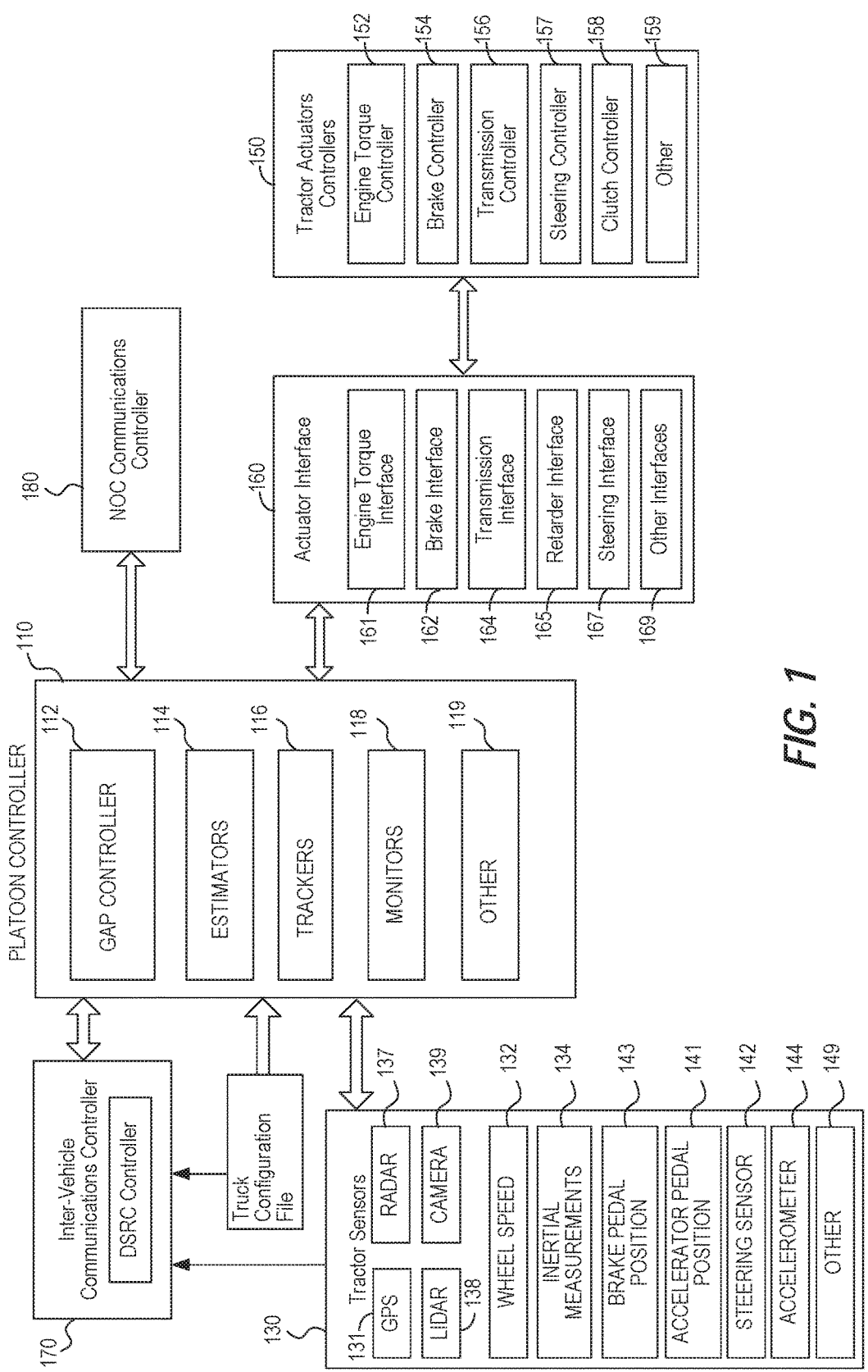
FIG. 1 is a block diagram of a controller architecture suitable for use in an automated or partially automated vehicle control system that supports platooning.

The architecture and design of control systems suitable for implementing vehicle platooning may vary widely. The specific controller design can vary based on the level of automation contemplated for the controller, as well as the nature of and equipment available on the host vehicles participating in the platoon. By way of example, FIG. 1 diagrammatically illustrates a vehicle control architecture that is suitable for use with platooning tractor-trailer trucks. The specific controller illustrated is primarily designed for use in conjunction with a platooning system in which both vehicles include an active driver. The driver of the lead vehicle being fully responsible for control of the front vehicle. The a driver of the trailing vehicle is responsible for steering the trailing vehicle, but the platoon controller 110 is primarily responsible for controlling the trailing vehicles torque and braking requests during active platooning. However it should be appreciated that generally similar control schemes can be used in systems which contemplate more automated control of one or both of the platoon partners or which utilize vehicle control commands other than or in addition to torque and braking requests.

In the illustrated embodiment illustrated in FIG. 1, a platoon controller 110, receives inputs from a number of sensors 130 on the tractor and/or one or more trailers or other connected units, and a number of actuators and actuator controllers 150 arranged to control operation of the tractor's powertrain and other vehicle systems. An actuator interface 160 may be provided to facilitate communications between the platoon controller 110 and the actuator controllers 150. The platoon controller 110 also interacts with an inter-vehicle communications controller 170 which orchestrates communications with the platoon partner and a NOC communications controller 180 that orchestrates communications with a network operations center (NOC). The vehicle also preferably has selected configuration files 190 that include known information about the vehicle.

Some of the functional components of the platoon controller 110 include gap controller 112, a variety of estimators 114, one or more partner vehicle trackers 116 and various monitors 118. In many applications, the platoon controller 110 will include a variety of other components 119 as well. Exemplary embodiments of the platoon controller 110 and gap controller 112 are described in more detail below with reference to FIGS. 2 and 3.

Some of the sensors utilized by the platoon controller 110 may include GNSS (GPS) unit 131, wheel speed sensors 132, inertial measurement devices 134, radar unit 137, lidar unit 138, cameras 139, accelerator pedal position sensor 141, steering wheel position sensor 142, brake pedal position sensor 143, and various accelerometers 144. Of course, not all of these sensors will be available on all vehicles involved in a platoon and not all of these sensors are required in any particular embodiment. A variety of other sensor 149 (now existing or later developed or commercially deployed) may be additionally or alternatively be utilized by the platoon controller in other embodiments. In the primary embodiments described herein, GPS position data is used. However, GPS is just one of the currently available global navigation satellite systems (GNSS). Therefore, it should be appreciated that data from any other GNSS system or from other suitable position sensing systems may be used in place of, or in addition to the GPS system.

Many (but not all) of the described sensors, including wheel speed sensors, 132, radar unit 137, accelerator pedal position sensor 141, steering wheel position sensor 142, brake pedal position sensor 143, and accelerometer 144 are relatively standard equipment on newer trucks (tractors) used to pull semi-trailers. However, others, such as the GNSS unit 131 and lidar unit 138 (if used) are not currently standard equipment on such tractors or may not be present on a particular vehicle and may be installed as needed or desired to help support platooning.

Some of the vehicle actuators controllers 150 that the platoon controller may direct at least in part include engine torque controller 152 (which is often part of the integrated functionality of an engine control unit (ECU) or powertrain control module (PCM)); transmission controller 154; brake controller 156; steering controller 157 (when automated steering is provided); and clutch controller 158. Of course, not all of these actuator controllers will be available or are required in any particular embodiment and it may be desirable to interface with a variety of other vehicle actuator controllers 159 that may be available on the controlled vehicle as well. Therefore, it should be appreciated that the specific actuator controllers 150 directed or otherwise utilized by the platoon controller on any particular controlled vehicle may vary widely. Further, the capabilities of any particular actuator controller (e.g. engine torque controller 152), as well as its interface (e.g., the nature and format of the commands, instructions, requests and messages it can handle or generate) will often vary with the make and model of that particular actuator controller. Therefore, an actuator interface 160 is preferably provided to translate requests, commands, messages and instructions from the platoon controller 110 into formats that are appropriate for the specific actuator controller hardware and software utilized on the controlled vehicle. The actuator interface 160 also provides a mechanism for communicating/translating messages, commands, instructions and requests received from the various actuator controllers back to the platoon controller 110. Typically an appropriate actuator interface would be provided to interact with each of the specific vehicle controllers utilized. In various embodiments, this may include one or more of: an engine torque interface 161; a brake interface 162; a transmission interface 164; a retarder interface 165 (if a separate retarder controller is used); a steering interface 167; and/or any other appropriate controller interface 169.

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder will be controlled by the engine torque controller 152 and in such embodiments, the retarder can be controlled by sending appropriate torque commands (which may be negative) to the engine torque controller 152. In other embodiments a separate retarder controller (not shown) may be accessible to, and therefore directed by, platoon controller 110 through an appropriate retarder interface 165. In still other embodiments, the platoon controller 110 may separately determine a retard command that it sends to the actuator interface 160. In such embodiments the actuator interface will interpret the retard command and pass on appropriate retardation control commands to the ECU or other appropriate vehicle controller.

The communications between vehicles may be directed over any suitable channel and may be coordinated by inter-vehicle communications controller 170. By way of example, the Dedicated Short Range Communications (DSRC) protocol (e.g. the IEEE 802.11p protocol), which is a two-way short to medium range wireless communications technology that has been developed for vehicle to vehicle communications, works well. Of course other communications protocols and channels may be used in addition to or in place of a DSRC link. For example, the inter vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee or any other now existing or later developed communications channels using any suitable communication protocol.

The specific information transmitted back and forth between the vehicles may vary widely based on the needs of the controllers. In various embodiments, the transmitted information may include the current commands generated by the platoon controller 110 such as requested/commanded engine torque 280, requested/commanded braking deceleration 282. They may also include steering commands, gear commands, etc. when those aspects are controlled by platoon controller 110. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms— as for example, in response to driver inputs (e.g., accelerator pedal position, brake position, steering wheel position, etc.).

In many embodiments, much or all of the tractor sensor information provided to platoon controller 110 is also transmitted to the platoon partner and corresponding information is received from the platoon partner so that the platoon controllers 110 on each vehicle can develop an accurate model of what the partner vehicle is doing. The same is true for any other relevant information that is provided to the platoon controller, including any vehicle configuration information 190 that is relevant to the platoon controller. It should be appreciated that the specific information transmitted may vary widely based on the requirements of the platoon controllers 110, the sensors and actuators available on the respective vehicles, and the specific knowledge that each vehicle may have about itself.

The information transmitted between vehicles may also include information about intended future actions. For example, if the lead vehicle knows it approaching a hill, it may expect to increase its torque request (or decrease its torque request in the context of a downhill) in the near future and that information can be conveyed to a trailing vehicle for use as appropriate by the platoon controller 110. Of course, there is a wide variety of other information that can be used to foresee future torque or braking requests and that information can be conveyed in a variety of different forms. In some embodiments, the nature of the expected events themselves can be indicated (e.g., a hill, or curve or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as the cellular network, various Wi-Fi networks, satellite communications networks and/or any of a variety of other networks as appropriate. The communications with the NOC may be coordinated by NOC communications controller 180. The information transmitted to and/or received from the NOC may vary widely based on the overall system design. In some circumstances, the NOC may provide specific control parameters such as a target gap tolerance. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to the platoon controller. The NOC may also provide information about the partner vehicle including its configuration information and any known relevant information about its current operational state such as weight, trailer length, etc.

The configuration file 190 may include a wide variety of information about the host vehicle that may be considered relevant to the controller. By way of example, some of the information might include the vehicle's specification including such things as engine performance characteristics, available sensors, the nature of its braking system, the location of its GNSS antenna relative to the front of the cab, gear ratios, differential ratios etc.

Figure 2:
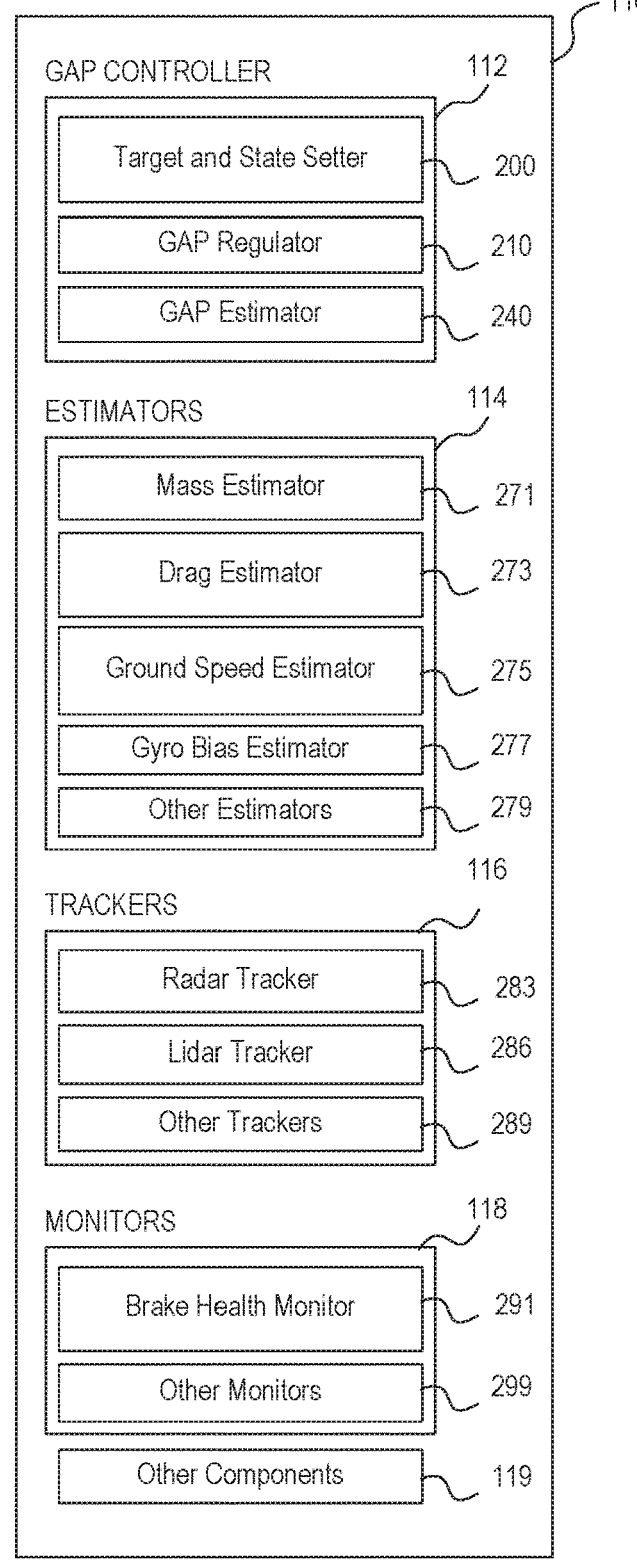
FIG. 2 is a block diagram of a representative platoon controller architecture suitable for use in the automated or partially automated vehicle control system of FIG. 1.

FIG. 2 illustrates a particular embodiment of a platoon controller 110. In the illustrated embodiment, the platoon controller 110 includes a gap controller 112, a plurality of estimators 114, one or more trackers 116, any desired monitors 118 and potentially any of a variety of other components 119.

In the illustrated embodiment, the gap controller 112 includes a target and state setter 200, a gap regulator 210 and a gap estimator 240. In general, the target and state setter 200 is arranged to determine the intended operational mode (state) of the gap regulator 210 and the values of any variable control parameters that are appropriate for use in that operational mode.

The gap regulator 210 is arranged to control the trailing platoon partner in the manner designated by the target and state setter 200. In the gap control operational mode, the gap regulator 210 controls the vehicle in a manner that seeks to attain and maintain the desired gap in accordance with any designated control parameters specified by the state setter 200. In other modes, the gap regulator 210 controls the vehicle in a manner that seeks to attain the appropriate response for the selected operational mode.

The gap estimator 240 is arranged to estimate/determine the current gap based on actual measurements and/or other information that is available to the platoon controller 110. It should be apparent that an accurate understanding of the current gap is important to successful operation of the gap regulator. At the same time, it should be appreciated that any measurement system has inherent tolerances and can be subject to reporting errors and/or may become unavailable in some circumstances. Thus, the gap estimator 240 is configured to receive information from multiple position or relative position related sensors and to fuse such data into a reliable estimate of the current gap.

The torque and braking requests generated by GAP regulator 210 are sent to the appropriate actuator interface (e.g., engine torque interface 161 and brake interface 162 respectively). The engine torque interface 161 then forwards an appropriate torque command to engine torque controller 152 which directs the delivery of the requested torque by directing various engine operating parameters such as fuel charge, valve timing, retarder state, etc. appropriately. The brake interface 162 generates an appropriate brake request that is sent to the brake controller 156.

A particular embodiment of gap controller 112 is described in more detail below with reference to FIG. 3.

Returning to FIG. 2, there are a variety of estimators 114 that are useful for the gap controller 112. In various embodiments these may include one or more of a mass estimator 271, a drag estimator 273, a ground speed estimator 275, a gyro bias estimator 277 and/or other estimators 279.

The mass estimator 271 is arranged to estimate the respective masses of the platoon partners. These mass estimations may be used by the gap controller 112 to help scale its torque and brake requests appropriately based on the respective weights (masses) of the platoon partners.

The drag estimator 273 is arranged to estimate the respective drag resistances of the platoon partners. These drag resistance estimates may also be used by the gap controller to help adjust its torque and brake requests appropriately. In general, the drag resistance of any particular truck or other vehicle can vary based on a variety of factors including: (a) its drag profile (which in the context of a truck may change based on the trailer being pulled—if any, or other characteristics of the load); (b) the vehicle's current speed, (c) wind speed and direction, (d) rolling resistance, (e) platoon state (e.g., whether a platoon is active, the position of the vehicle within the platoon, the gap), (f) bearing wear, etc.

The ground speed estimator 275 is arranged to estimate the actual ground speed of the respective platoon partners. Many trucks and other vehicles have wheel speed sensors that can quite accurately measure the rotational speed of the associated wheels. The actual ground speed at which the vehicles are traveling will vary based on the respective diameters of the wheels and slip conditions of the tires. The precise diameter of the wheels can vary based on the tires used. Furthermore, the diameter of the wheels will vary over time with tire wear, changes in ambient temperature and other factors. The wheel diameter will even change over the course of a particular trip as the tires heat up (or otherwise change in temperature) during use. In practice, all of these variations in wheel diameter are potentially significant enough to impact the gap estimation and gap control. Therefore, the ground speed estimator 275 is arranged to estimate the actual ground speed based on measured wheel speed and other available information such as GNSS information. The ground speed estimates are particularly useful in times when tracker based gap measurements (e.g., radar, cameras, lidar, ultrasound etc.) aren't available—which may occur, for example, when the platoon partners are laterally offset due to a lane change, etc.

Several of the measurements utilized by the gap controller 112 are inertial measurements that are gyro based. These may include yaw measurements which indicate the rate at which the associated vehicle is turning, longitudinal acceleration measurements, etc. Gyros often have an inherent measurement error referred to as a gyro bias that can affect measurements. The gyro bias estimator 277 estimates such biases to allow the gap controller to compensate for such gyro based measurement errors.

The platoon controller 110 can include any other estimators 279 that may be useful to any particular gap controller 112 as well.

The platoon controller 110 may also include one or more trackers 116. Each tracker 116 is arranged to measure or otherwise determine the gap. One type of tracker that is used in many implementations is a radar based radar tracker 283. Newer commercially available trucks often come equipped with a radar unit as standard equipment and radar trackers are particularly well suited for use in such vehicles. Of course, one or more radar units may be installed on any vehicle that does not come pre-equipped with a radar unit to facilitate use of radar tracker 283. By way of example, some specific radar trackers are described in more detail in co-pending U.S. application Ser. Nos. 15/590,715 and 15/590,803, both filed May 9, 2017, both of which are incorporated herein by reference.

Lidar is another distance measuring technology that is well suited for measuring the gap between vehicles. Lidar is quickly gaining popularity for use in automated and autonomous driving applications. Lidar tracker 286 is well suited for use on vehicles that have or are provided with lidar units. Cameras and stereo cameras are also becoming more popular distance measuring tools for use in various automated and autonomous driving applications.

Of course, other distance measuring technologies can be used to measure or estimate the gap between vehicles as represented by other trackers 289. By way of example, a GPS tracker could be used that is based primarily on the respective reported GPS positions of the vehicles. In another example, ultrasound based distance measuring unit may be used.

The tracker(s) used in many embodiments are configured to fuse data from multiple sensors to help validate the measurements of the primary sensors used by the respective trackers. The aforementioned radar tracker application describes a variety of methods for fusing data to help validate measurements of a primary sensor in that manner.

In various embodiments, the gap estimator 240 could replace or be replaced by one or more of the trackers, or could be thought of as a tracker itself since it determines/estimates the gap based on inputs from multiple sensors. In the illustrated embodiment, the gap estimator 240 is shown separately as part of gap controller 112 since it fuses distance data from the tracker(s) and any other available sources such as GNSS sensors on each of the vehicles.

The platoon controller 110 may also include one or more monitors 118 that are configured to monitor specific components that are relevant to gap control. By way of example, one specific monitor that is particularly useful to the control of platooning trucks is brake health monitor 291. The brake health monitor 291 is configured to monitor the brake system and to identify circumstances in which the brakes may not be able to deliver the level of braking normally expected for platoon control—as for example could occur if the foundation brakes include drum brakes that have been used while traveling downhill in the mountains to the extent that they are close to overheating. If the brake health monitor 291 identifies such a circumstance, it informs the platoon controller, which can take the appropriate remedial action. The appropriate remedial action will vary based on the specific circumstances identified by the brake health monitor, but may include, for example, actions such as dissolving the platoon, increasing the target gap to a level more appropriate for the brake conditions, etc. Of course, the brake health monitor can also configured to identify circumstances in which the condition of the brakes has improved (e.g., the brakes have cooled sufficiently) and inform the platoon controller of those circumstances as well so that the platoon controller can act accordingly. For example, improved braking status may allow the target gap to be reduced, a platoon to be reestablished or other appropriate actions.

The platoon controller may include any of a variety of other monitors 299 that are configured to monitor the state or status of other components, systems, environmental conditions, road or traffic conditions, etc. that may be relevant to platoon control. For example, a DSRC link monitor may be provided to monitor the status of a DSRC communication link between the platoon partners.

Figure 3:
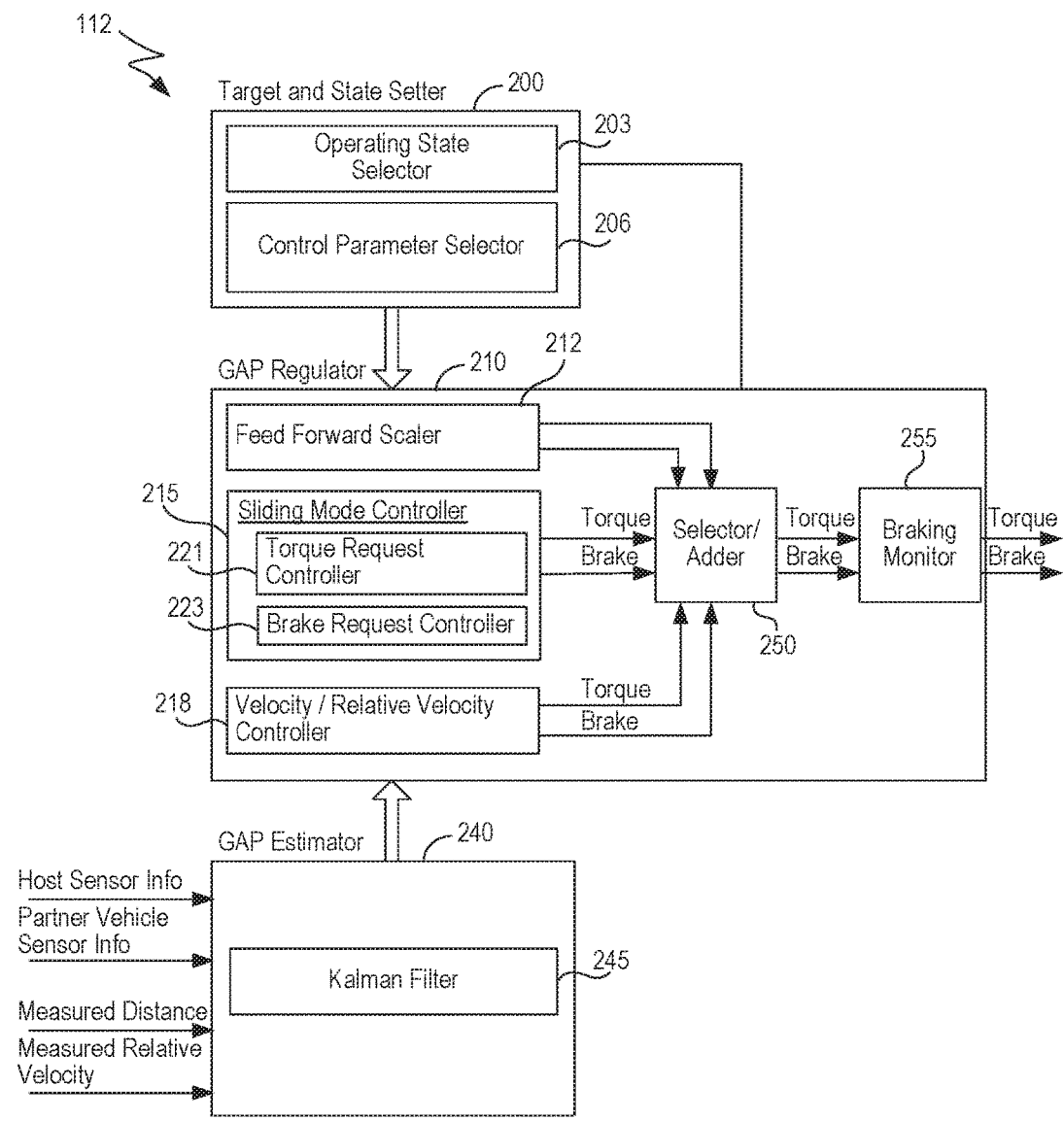
FIG. 3 is a block diagram of a gap controller in accordance with one embodiment.

Referring next to FIG. 3, another embodiment of gap controller 112 will be described in more detail. Similarly to the embodiment illustrated in FIG. 2, the gap controller 112 includes a target and state setter 200, a gap regulator 210 and a gap estimator 240. In the embodiment of FIG. 3, the target and state setter 200 includes an operating state selector 203, and a control parameter selector 206 that determines, selects, sets or otherwise indicates to the gap regulator the values of any variable control parameters that are appropriate for use in the selected operational mode.

The operating state selector 203 is arranged to determine the intended operational mode (state) of the gap regulator 210. In some specific embodiments, the operational modes might include a "normal" or "gap control" operational mode in which the gap regulator is configured to control towards attaining an maintaining a designated gap between the vehicles. In the gap control operational mode control parameter variables dictated by the control parameter selector might include the target gap itself (e.g. 10 m, 12 m, etc.)—which may vary somewhat based on driving conditions (e.g., weather, terrain, road conditions, traffic, etc.). Other control parameters during normal operation may include parameters that impact the draw-in speed, the tightness of the control, tolerances or variations between torque control and braking control, etc. In other embodiments, "initiate platoon" and/or "draw-in" or "pull-in" may be one or more separate states that are used to establish a platoon and/or to bring the platoon partners together in a safe manner under at least partially automated control.

Another potential operational mode is a "dissolve" mode in which the platoon controller transitions the trailing vehicle toward/to a position at which the driver of the trailing vehicle (or an automatic cruise control system) can safely take over control of the vehicle. Generally, dissolving a platoon includes increasing the gap between the vehicles in a controlled manner to/towards a point at which the platoon can be dissolved and vehicle control can be safely transferred to manual control by the driver or to control through the use of a different system such as adaptive cruise control. The dissolve mode may optionally be triggered by a wide variety of different circumstances, as for example, in response to one of the platoon partners or the NOC deciding to terminate the platoon; the detection of a car cutting-in between the platooning vehicles; the loss of communications between the vehicles for an extended period; the detection of an object in front of the lead vehicle that is too slow or too close to the platoon; etc.

Another potential operational mode may be a velocity control or relative velocity control mode. Velocity control, or relative velocity control may be preferable to trying to control to maintain a particular gap in a variety of specific circumstances—as for example when the trailing vehicle's radar (or other) tracking unit loses sight of the partner vehicle, as can occur when there is a lateral offset between the vehicles due to a lane change or other conditions.

Of course, there can be a variety of other operational modes as well.

The gap regulator 210 is arranged to control the trailing platoon partner in the manner designated by the target and state setter 200. In the embodiment illustrated in FIG. 3, the gap regulator 210 includes a scaler 212 and two separate controllers which are used in different combinations in different operating modes. In the illustrated embodiment, the controllers include a sliding mode controller 215 (which performs gap control) and a velocity/relative velocity controller 218. It should be appreciated that in other embodiments, a single controller, additional and/or different may be provided as appropriate for any particular implementation.

In the illustrated embodiment, the feed forward scaler 212 is configured to scale the torque and brake signals from the front vehicle before adding them to the outputs from the sliding mode and relative velocity controllers 215, 218 to create the torque and brake request to the engine and brake controllers. Such scaling may be based on factors such as the respective weights (masses) of the platoon partners, the respective drags of the vehicles, the severity of a braking event (e.g., in high braking scenarios, the braking command may be increased a bit to provide a margin of safety to account for uncertainties in braking performance and reactions times), etc. In other embodiments, such scaling functions can be integrated into the respective controllers themselves if desired.

The sliding mode controller 215 is configured to control the trailing vehicle in a manner that seeks to attain and maintain the desired gap in accordance with the target gap and any other control parameters specified by the control parameter selector 206. Thus, its primary function is gap control. The velocity controller 218 is configured to control the trailing vehicles in a manner that maintains a designated velocity relative to the lead vehicle, or in some circumstances, simply a designated velocity. In the illustrated embodiment, these two separate controllers are provided so that the gap regulator 210 can provide different types of control, as may be appropriate in different operational circumstances. A few specific examples are described with reference to FIGS. 4A-4C. In the described embodiments, both the controllers 215 and 218 are operated continuously during platooning and the selector/adder 250 is used to select the appropriate signals to output based on the current operating mode. An optional braking monitor 255 is a safety feature that may be utilized to help ensure that the brake commands outputted by selector/adder 250 don't overly aggressively brake the trailing vehicle except in where necessary from a safety/crash prevention standpoint. This is to reduce the risk of traffic behind the trailing platoon partner from being impacted by unexpected aggressive braking of the trailing platoon partner.

Figure 5:
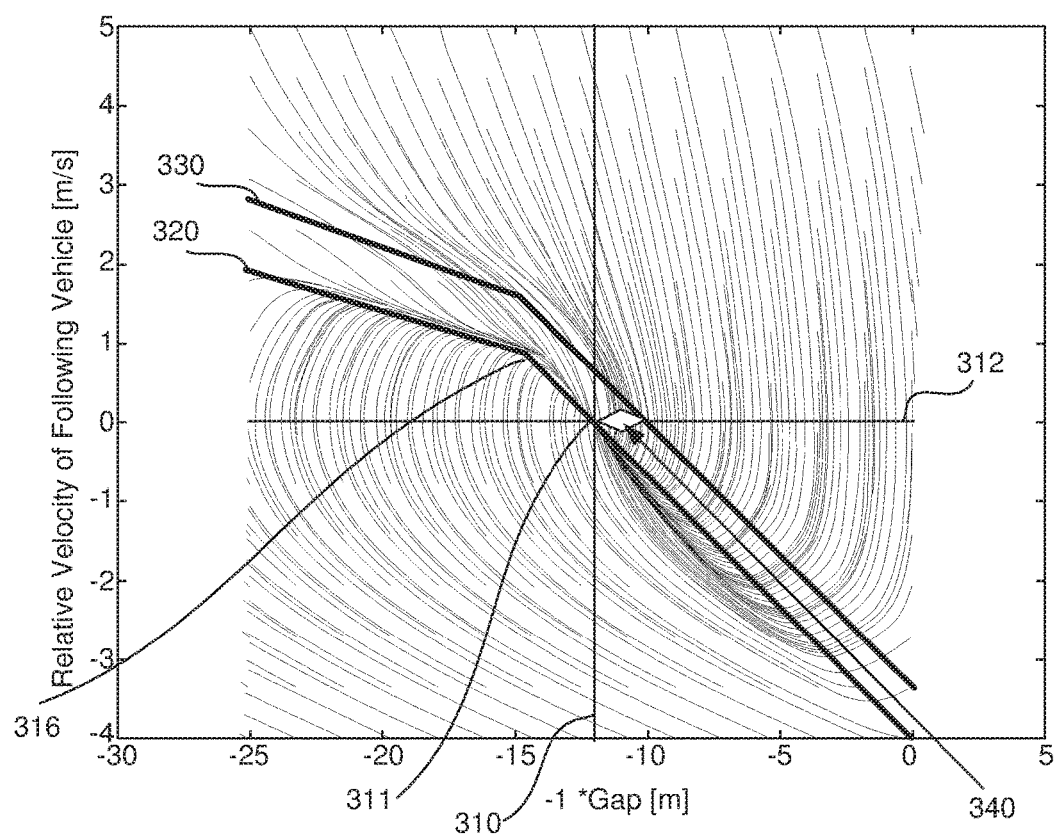
FIG. 5 is a state space diagram illustrating a sliding mode control scheme.

The sliding mode controller 215 is arranged to control the trailing vehicle in a manner such that its relative velocity relative to the front vehicle varies as a function of the gap between the vehicles. This characteristic is illustrated in the state space diagrams of FIG. 5 which show a control scheme in accordance with one specific implementation. More specifically, FIG. 5 plots relative velocity between the vehicles (the Y-axis) vs. gap between the vehicles (the X-axis). FIG. 5 also show a torque request controller target control line 320. In the illustrated embodiment, the nominal desired gap is 12 meters—which is represented by line 310. Thus, the target control point 311 is 12 meters with zero relative velocity, which is the point represented by the intersection of line 310 (12 meters gap) and line 312 (zero relative velocity).

The torque request controller component 221 of gap regulator 210 is configured to generate a torque request that is appropriate to control the gap in accordance with target control line 320. The torque request is then implemented by engine torque controller 152. As can be seen in FIG. 5, when the gap is larger than the desired gap, the rear truck is controlled to travel slightly faster than the front truck is traveling such that the relative velocity of the rear truck has a small positive value. As the rear truck draws closer to the lead truck, its relative velocity is reduced in a smooth manner until the gap is reduced to the target control point 311, at which point the relative velocity would be zero if perfect control were attained. If the rear truck gets closer than the desired gap, it is slowed so that it has a negative relative velocity relative to the lead truck to reestablish the desired gap.

The sliding mode controller 215 utilizes a unified sliding mode control scheme during both the "pull-in" and gap maintenance stages of platooning. Configuring the sliding mode controller to control towards target control line 320 helps ensure that the relative speed vs. gap relationship stays within a region safe for platooning.

In the embodiment illustrated in FIG. 3, the sliding mode controller 215 includes separate controllers (e.g. torque request controller 221 and brake request generator components 223) which are configured to control towards different gap control targets. The different control targets are illustrated in the state space diagrams of FIG. 5 which show a control scheme in accordance with one specific implementation. More specifically, FIG. 5 shows a brake request controller target control line 330 in addition to torque request controller target control line 320. FIG. 5 additionally shows representative transition paths from various points in the state space to the torque request target control line 320.

For most open highway driving conditions, modulating the torque request alone is sufficient to control the gap appropriately without requiring the use of the foundation brakes. This is in part because the torque request can be negative to a certain degree without needing to actuate the foundation brakes through the use of engine braking and/or the retarder (if available). As mentioned above, when fuel is cut-off there will be some pumping losses and some frictional losses in the powertrain, so some level of negative torque can be provided while using normal valve timing by simply reducing the fuel charge appropriately. When larger negative torque is needed, the engine torque controller 152 can create larger negative torques by actuating the retarder and/or by taking other appropriate measures.

Separately, the brake request controller component 223 of gap regulator 210 is arranged to generate brake requests during normal operation that are generally arranged to maintain a different gap—specifically a smaller gap—than the torque request controller 221 targets. This difference in the gaps that the torque and brake request controllers control to is sometimes referred to herein as the gap tolerance 340. In general, brake requests 213 are not generated unless or until the gap is reduced at least the gap tolerance below the torque request target control line 320. Since the brakes can only be used to slow the vehicle, the effect of this difference is that the trailing truck will be allowed to creep in a relatively small amount (2 meters in the example) before the foundation brakes are actuated when the gap regulator 210 cannot maintain the desired gap through control of the torque request alone. When the desired gap can be restored by modulating the torque requests alone without crossing target brake control line 330, then the foundation brakes do not need to be used at all. This has the effect of safely maintaining a gap while reducing the probability that the foundation brakes will be deployed unnecessarily.

Figure 4A:
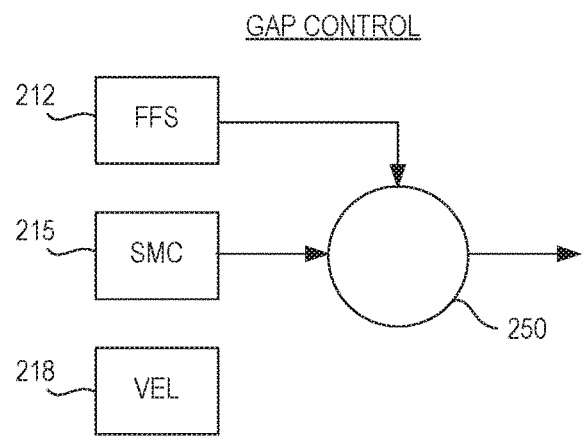
FIGS. 4A-4C are a series of diagrams illustrating different control states used by a gap regulator in accordance with one embodiment during different operational states.

Normal gap control is illustrated in FIG. 4A. During normal gap control, the sliding mode controller 215 is use to determine torque and brake requests that are appropriate to attain and maintain the target gap set by control parameter selector 206. When appropriate, the torque and brake requests generated by the sliding mode controller 215 may be scaled appropriately by selector/adder 250 based on inputs from feed forward scaler 212. In this normal gap control mode, the outputs of the relative velocity controller 218 are not used in the control of the trailing vehicle.

In some embodiments, the sliding mode controller 215 includes separate torque request and brake request controllers 221, 223 as illustrated in FIG. 3. The torque request and brake request controllers 221, 223 are configured to control the engine and brakes respectively towards different gap targets which tends to provide a smoother, more comfortable ride and reduce the use of wheel brakes (e.g., the foundation brakes in tractor-trailer rigs) compared to control in which the engine and brakes are controlled to the same target gap. Such a gap control architecture is described in more detail in U.S. Provisional application No. 62/489,662, which is incorporated herein by reference.

Although the sliding mode controller 215 works very well to control the gap, there will be operational circumstances in which different types of control may be appropriate. For example, a different type of control may be desirable when it is necessary to dissolve a platoon and return the trailing vehicle to manual or other automated control. Typically, the gap between vehicles during platooning will be smaller, often much smaller, than can safely be maintained by a driver under manual control. Therefore, in general, when a platoon is dissolved with the intent to restoring manual control of the trailing vehicle, it will be desirable to grow the gap to a distance that is appropriate for manual control before relinquishing control to the driver. This can be accomplished in a smooth manner by relative velocity controller 218.

Figure 4B:
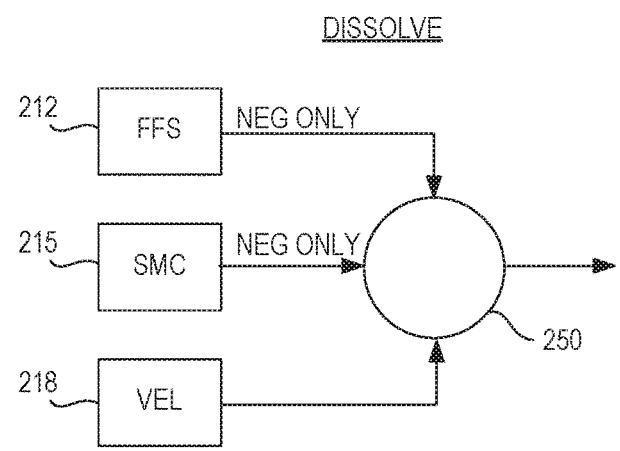

When operating state selector 203 determines that the platoon should be dissolved, it directs the GAP regulator 210 to transition to a dissolve mode as represented by FIG. 4B. In the dissolve mode, primary control is provided by relative velocity controller 218. The control parameter selector 206 may designate a desired (target) relative velocity for the trailing truck during the dissolve. The specific target relative velocity may vary based on the nature of the circumstances and/or the vehicles involved in the platoon. In general, it is desirable to select a relative velocity that will cause the vehicles to gradually, but expeditiously separate, without requiring the trailing vehicle to slow excessively (which could unduly hinder following traffic) and preferably without requiring the lead vehicle to alter its drive plan. By way of example, relative velocities during dissolves on the order of 0.5 to 4 meters per second, as for example, 1-2 m/s, have been found to work well in the context of platooning trucks.

During a dissolve, the lead vehicle may take a variety of actions. For example, the lead truck may accelerate or increase its torque command aggressively. In such cases, it may not be desirable to try to accelerate the trailing truck in a similar manner thereby allowing the lead vehicle to pull away more than would otherwise occur under relative velocity control. One way to accomplish this in the context of platooning trucks is to ignore or otherwise disable positive torque commands from feed forward scaler 212.

Another potential scenario is that the lead truck brakes or slows significantly while under velocity control. In some circumstances, the velocity controller 218 may be configured to permit a certain amount of gap shrinkage when the gap is relatively larger to thereby reduce the overall amount of braking required. In the illustrated embodiment, the sliding mode controller is configured to ensure that the gap between the vehicles is always sufficient to give the trailing vehicle sufficient time to respond in a manner that prevents the trailing vehicle from running into the back of the lead vehicle regardless of the occurrence of (reasonable) unexpected events. Therefore, if the sliding mode controller is outputting a braking or negative torque signal that has a greater magnitude than the relative velocity controller, then that larger braking/negative torque command should be passed to the vehicle's engine and braking controllers. Therefore, during a dissolve, the selector/adder 250 is configured to only utilize negative commands (i.e., braking commands and negative torque commands) from the sliding mode controller 215 and to only use such commands when they are greater in magnitude than the commands from the relative velocity controller 218.

There may also be operational circumstances outside of dissolves in which relative velocity control or simply velocity control is desired. For example, there may be circumstances in which the back of the lead vehicle moves out of view of the trailing vehicle's tracker(s) 116 or the tracker(s) 116 otherwise loses sight of the back of the platoon partner. This can occur, for example, as a result of a lane change by one of the platoon partners. In such a circumstance the gap regulator may not have an accurate measure of the longitudinal gap between the vehicles—and may have to rely on less accurate approaches for determining the gap such as the vehicle's respective GNSS positions. In such circumstances, it may be desirable to control the trailing vehicle to slowly drop back until the back of the lead vehicle comes within the tracker's view. Again, the relative velocity controller 218 is well suited for use in this circumstance—although the preferred relative velocity control may be a bit different than occurs during a dissolve. Specifically, the goal is typically not to drop back as quickly or as far as would occur during a dissolve—thus a smaller relative velocity (e.g. 0.5 m/s vs. 2 m/s), may be appropriate.

Figure 4C:
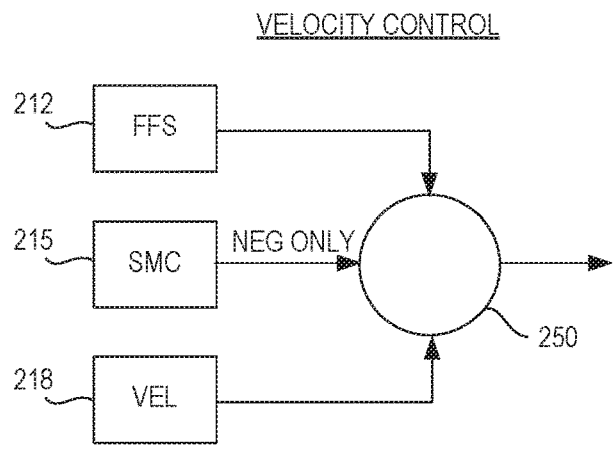

One approach to such relative velocity control is illustrated in FIG. 4C. In the velocity control scheme of FIG. 4C velocity controller 218 is used in conjunction with normal scaling from feed forward scaler 212. This causes the trailing platoon partner to better follow lead vehicle accelerations and/or torque increases than occurs during the dissolve state illustrated in FIG. 4B. At the same time, for safety purposes, braking requests and negative torque request from the sliding mode controller 215 may be utilized as appropriate by selector/adder 250 in a manner similar to the approach described above with respect to FIG. 4B.

Safety Focused Architecture

When developing an autonomous vehicle controller, it is important for the system to be safe (truly safe). It is also important for the system to be verifiably safe. That is, it is desirable to be able to verify with a high degree of confidence that the system is safe. As discussed in the background, some standards organizations and governments have promulgated guidelines and/or standards intended to classify the safety risks associated with vehicle operation. One such effort is the Automotive Safety Integrity Level (ASIL) risk classification scheme defined by ISO 26262—Functional Safety for Road Vehicles standard. There are currently four safety integrity levels identified by the ASIL standard: ASIL-A, ASIL-B, ASIL-C, and ASIL-D. ASIL-D represents the highest integrity requirements and ASIL-A corresponds to the lowest level compliance requirements of the defined standards. Matters that are not directly covered by the standard are identified as QM for "Quality Management" which from the context of ASIL, means that their integrity levels are not represented to fall within the copy of any of the ASIL standards.

There are potentially significant advantages to making a platoon control system verifiably safe, as for example, by making the platoon controller ASIL compliant (and/or compliant with other safety integrity level standards). Most notably, many ECUs, powertrain control modules (PCMs) and other controllers used in commercially available road vehicles are designed to expect that all commands that they receive come from ASIL compliant components that conform to a particular minimum ASIL level—as for example, at the ASIL-C level or higher. Therefore, it is desirable for control commands issued from the platooning system to be ASIL rated or to meet other designated reliability criteria or standards. It is also desirable for the overall system to be safe to some chosen level. Processes and standards like ISO 26262 are also useful to guide the development of safe systems.

ASIL compliance is a rigorous standard which requires extensive command integrity checking and data verification. In general, data used in ASIL integrity checking must come from, or be verified by ASIL compliant devices of at least the same integrity level. Inputs from QM rated devices (or lower level ASIL devices) may be used in ASIL compliant devices, as long as the reasonableness of their commands or data are verified by the ASIL device to the appropriate standards.

Some of the data used in platoon control (such as GPS position data) cannot itself be readily verified to a level required by ASIL. As such, it can be challenging to design every component in the entire platoon control system in a manner that meets the ASIL standards and thus ensures that the commands are proper to achieve safety targets. Therefore, it can be useful to divide the platoon control system into distinct QM and ASIL components (or different ASIL level components), with all of the components that send instructions directly to any of the vehicles control systems being ASIL compliant (or compliant to the higher ASIL level).

Figure 6:
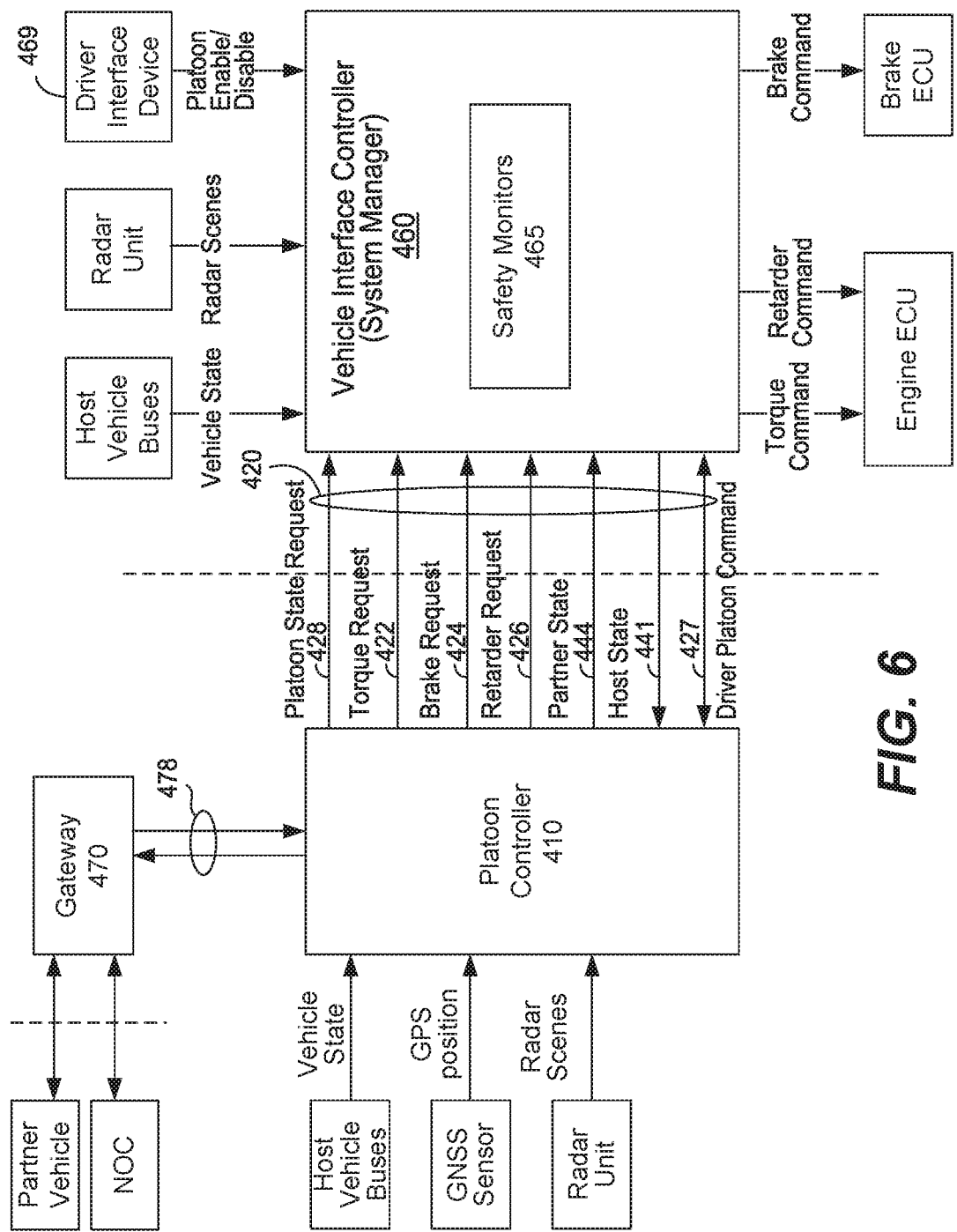
FIG. 6 is a specific ASIL compliant controller hardware architecture suitable for use in an automated or partially automated vehicle control system that supports platooning.
Figure 7:
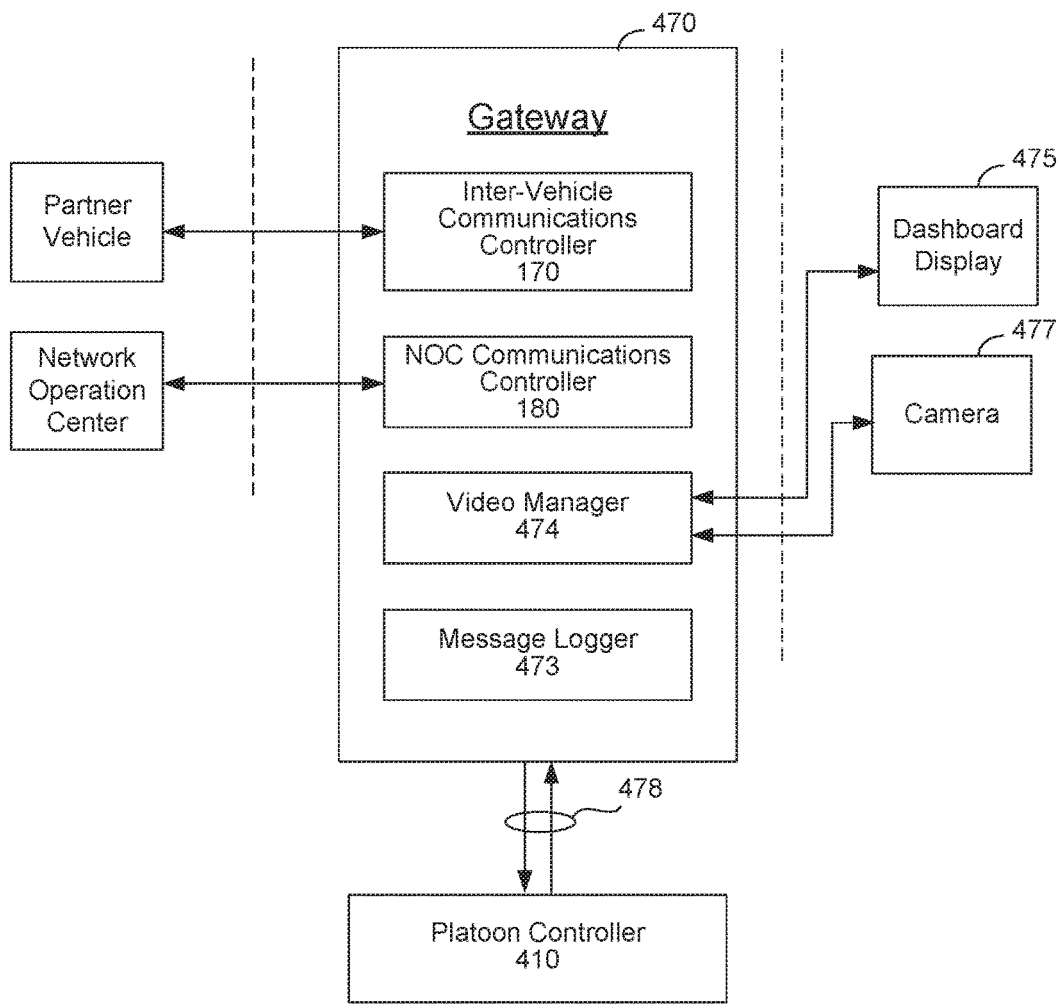
FIG. 7 illustrates components of a gateway in accordance with one embodiment.

FIG. 6 illustrates a platoon control system hardware architecture that is particularly well suited suitable for ASIL compliant platoon control. The illustrated embodiment includes three separate controller hardware units. These include platoon controller 410, vehicle interface controller 460 and gateway processor 470. Selected components of a representative gateway processor 470 are illustrated in FIG. 7. As best seen in FIG. 6, the platoon controller 410 communicates with the vehicle interface controller 460 through an interface 420 and with gateway 470 through a direct link 478. In some embodiments, the link 478 is a dedicated direct wired connection and no other devices are coupled to that link. The wired connection may be provided by any suitable form of cabling or traces, as for example co-ax cable, twisted pair wirings, fiber optics or any other suitable physical connection medium.

In the illustrated embodiment, the platoon controller 410 incorporates all of the functionality of platoon controller 110 described above. The vehicle interface controller 460 (also sometimes referred to as a system manager) performs the functionality of actuator interface 160 and further includes a number of safety monitors. In some embodiments, the safety monitors are arranged to execute ASIL compliant safety monitoring algorithms and the vehicle interface controller 460 is designed as an ASIL compliant device.

In general, the vehicle interface controller 460 includes a higher safety level processor and software (including the safety monitors) that independently verify the commands transmitted by the platoon controller 110 before they are passed on to the vehicle actuators. These verifications use a subset of the available sensor inputs, together with verification algorithms that are independent and distinct from those used by the platoon controller.

The gateway processor 470 is arranged to coordinate communications between a host vehicle and the platoon partner(s) and to coordinate communication between the host and the network operation center and/or any other entities that are external to the vehicle. As such, in a specific implementation of the system illustrated in FIG. 1 the gateway processor 470 includes the inter-vehicle communications controller 170 and NOC communication controller 180 as best illustrated in FIG. 7. Typically the inter-vehicle communications controller utilizes a short-range, vehicle-to-vehicle wireless communications protocol, as for example the DSRC protocol. The NOC communication controller typically communicates with a networks operations center using cellular or satellite communications.

In some embodiments, the connection (link 478) between the gateway processor 470 and the platoon controller 410 is a dedicated direct wired connection and no other devices are coupled to the link. In some implementations an Ethernet or similar standardized wired communications protocol is used to pass information between the gateway processor and the platoon controller. This facilitates high speed, high reliability communications between the gateway processor and the platoon controller. In a specific example, a 100BASE or higher (e.g. 1000BASE, 10GBASE, etc.) Ethernet physical layer may be used, although it should be appreciated that a variety of other physical layers may be used in other embodiments.

In some embodiments, the gateway processor 470 is also arranged to communicate with a forward facing camera 477 mounted on the vehicle and a dashboard display 475. When the host vehicle is the lead vehicle in a platoon, the gateway processor transmits a video feed received from the forward facing camera 477 to the trailing vehicle(s) so that the driver of the trailing vehicle has a view of what is in front of the lead vehicle. When the host vehicle is a trailing vehicle in the platoon, the gateway processor 470 receives such a video feed from the gateway processor on the lead vehicle and transmits the feed to the dashboard display 475 where it is displayed to give the driver of the host vehicle a view of what is in front of the lead vehicle. Displaying a view of what is in front of the lead vehicle to drivers of a trailing vehicle is desirable since the to give the driver of the trailing vehicle a sense of comfort and the ability to independently react to situations that occur in front of the platoon. This can be particularly important because in many platoons (e.g. platoons that involve tractor trailer trucks) the trailing vehicle will be very close to the lead vehicle (much closer than normal manual driving) and the lead vehicle will effectively block the view of the trailing vehicle which can be an uncomfortable experience for drivers and/or passengers in a trailing platoon partner—especially when they do not have access to a view of what is going on in front of the platoon.

The video streams passed through the gateway may be managed by a video manager 474. Since the gateway 470 communicates directly with the camera 477 and/or dashboard display 475, the platoon controller 410 is not in any way burdened by the need to manage that data flow.

In some embodiments the gateway 470 also includes a message logger 473 that logs various messages and other information passed there through in order to provide a record for diagnostic purposes and the like. The functionality of the message logger 473 will be described in more detail below.

The platoon controller 410 is configured as a listener on any appropriate vehicle communications buses where it can directly obtain information about the vehicle's operational state—such as the vehicle's current wheel speed, any brake or accelerator pedal inputs, steering wheel position (as appropriate), transmission gear, etc. It is also coupled to sensor units such as GPS unit 131 to receive positional information about the location of the vehicle, and to forward looking radar unit 137 to receive information about the position of objects outside the vehicle (e.g., radar scenes). Similar information may be obtained from other sensors as well, such as lidar 138, camera(s) 139 etc. Since the platoon controller 410 is configured strictly as a listener on the vehicle's communication bus(es) and does not itself transmit information over such bus(es), it does not need to be ASIL compliant, as long as the control commands it outputs to the vehicle interface controller are verified to ASIL standards by the vehicle interface controller 460.

The vehicle interface controller 460 (also sometimes referred to as the system manager 460), which is ASIL compliant, is arranged to send commands to, and otherwise communicate with, the vehicle's engine controller (EECU), the brake controller (B ECU), and/or any other appropriate controllers either directly or via one or more communications buses, such as the vehicle's CAN bus(es).

In the illustrated embodiment, the interface 420 between platoon controller 410 and vehicle interface controller 460 (also sometimes referred to as the system manager 460) is fairly narrowly defined. It includes the substantive commands generated by the platoon controller—which in the illustrated embodiment include torque request 422, brake request 424, and optionally a retarder request 426. When the platoon controller also controls the steering or other aspects of the host vehicle steering and/or other appropriate control commands (not shown) may be included as well.

The interface 420 also includes a platooning state indicator 428 that is a signal from the platoon controller indicating whether or not it believes that its output should be directing operation of the vehicle. The platooning state indicator 428 may take many forms, as for example a simple flag that when high indicates that the platoon controller 410 believes that platooning is/should be active and that its torque, braking and retard commands 422, 424, 426 should be followed. In such an arrangement, a low flag state indicates that the platoon controller believes that it is not controlling the vehicle. The vehicle interface controller 460 does not forward any torque, braking, retard or other control commands at any time that the platooning state indicator 428 indicates that platoon control is not active. In the event (generally unlikely) that one of the safety monitors 465 indicates that platooning is not appropriate when the platoon controller 410 believes that platooning is valid (as indicated by platooning state indicator 428), the vehicle interface controller/system manager 460 initiates a termination of the platoon.

The interface 420 also facilitates the transmission of certain state information—which is preferably ASIL validated state information—about both the host vehicle and the partner truck that is useful to the safety monitors. Specifically, the host vehicle state information 441 includes state information about the host vehicle that has been validated (e.g., ASIL-C validated) by the system manager 460 and is useful to one or more safety monitors on the partner vehicle. The partner vehicle state information 444 includes state information about the partner vehicle that has been validated by the partner vehicle's system manager and is useful for one or more safety monitors 465 on the host vehicle. Host vehicle state information 441 is transmitted to the platoon controller 410, which forwards such information without modification to the gateway 470, which in turn forwards the host vehicle state information to the gateway on the partner vehicle. Partner vehicle state information 444 received by gateway 470 from the partner vehicle's gateway is forwarded without modification to the platoon controller 410 and from there to system manager 460 (again without modification). Preferably the host state information 441 is transmitted with a checksum or other suitable data integrity verification mechanism that allows the receiving system manager to verify that the data it receives is uncorrupted. Any corrupted information can then be ignored. With this approach the ASIL validated state information is passed without modification from one ASIL compliant device (system manager 460 on a first platoon partner) to another (system manager 460 on a second platoon partner) and therefore is suitable for use in ASIL compliant safety checking algorithms—even when intermediate transmitting devices (e.g., platoon controller 410, gateway 470) are not themselves ASIL compliant.

The host and partner vehicle state information may include any ASIL validated state information that is used by any of the safety monitors. This may include, for example, vehicle wheel speeds, brake requests, torque requests and/or delivered torque, brake air supply pressure, steering position, accelerometer readings, brake pad wear, tire pressure, engine temperature, pedal position and/or any other information about the partner vehicle used by the system manager 460 as part of a safety monitor. To the extent that the platoon controller 410 utilizes partner state information originated by an ASIL validated device beyond the state information used by the system manager 460, that information can optionally be included in the vehicle state information 441, 444 as well—although such inclusion is not necessary and usually not desirable since such information can typically be obtained and sent by the partner vehicle's platoon controller, which reduces the bandwidth that needs to be allocated to the interface 420.

It is noted that some of the host vehicle's sensor information (e.g., wheel speed, brake pedal position, radar scenes, etc) is used by both the platoon controller 410 and the system manager 460. Since the platoon controller 410 is preferably an authorized listener on any appropriate vehicle control bus(es), the platoon controller does not need to wait to receive such information from the system manager. Rather, it obtains any relevant host vehicle sensor information directly from the appropriate sensor over any suitable connection such as an appropriate CAN bus. However any sensor information relevant to the system manager on the partner vehicle is read by the system manager (regardless of whether it is also read by the platoon controller) and included in host vehicle state information 441 so that the partner vehicle's system manager is ensured that such information is ASIL verified. In other embodiments any host vehicle sensor information that is not directly accessible by the platoon controller can be received via the system manager 460 acting as an intermediary.

Although there will be some overlap in the sensor information used, it should be appreciated that the host vehicle sensor information used by the host vehicle platoon controller 410 and the host vehicle system manager 460 will often vary and may further vary from the partner vehicle sensor information of interest. For example, the host platoon controller utilizes GNSS position data in the determination of the torque and braking requests, however the GNSS position information may not be utilized by the System Manager since it is not ASIL compliant.

Some of the sensor information that is used by the safety monitor on the host vehicle may not be needed by the safety monitor on the partner vehicle. This may include information such as the radar scenes, the accelerator pedal position, inputs from a host vehicle driver interface device 469, etc. To the extent that such sensor information is not used by the partner vehicle, there is no need for such information to be included in the vehicle state information 441, 444.

Some of a host vehicle's sensor information that is used by the platoon controller on the partner vehicle may not be ASIL compliant and therefore may not be used in the safety monitors on the partner vehicle. Such, sensor information that is not relevant to the safety monitors on the partner vehicle does not need to be included as part of vehicle state information 441, 444. Rather, such data may be obtained by the platoon controller 410 and sent to the corresponding platoon controller on the partner vehicle (by way of communication controllers 470). For example, it is extremely difficult to ASIL validate GPS or other GNSS position data. Therefore, GNSS position data is preferably not included in the vehicle state information 441, 444. Rather, such information is passed from the host vehicle's platoon controller to the partner vehicle's platoon controller via the gateways 470.

The driver interface device 469 may be a button or other suitable mechanism positioned at a convenient location on the host vehicle dashboard or elsewhere in the host vehicle cabin. The driver interface device 469 is a mechanism that the driver may press as appropriate to indicate that the driver is ready to platoon during initiation of a platoon, or to initiate the dissolution of a platoon when platooning is no longer desired. The use of the driver interface device 469 is described in more detail in U.S. patent application Ser. No. 15/607,902 which is incorporated herein by reference. In the illustrated embodiment, commands from the driver interface device 469 (which are preferably ASIL compliant) are sent to the vehicle interface controller 460 and passed from there to the platoon controller 410. Similarly, requests to the driver interface device pass from the platoon controller to the vehicle interface controller 460 and from the vehicle interface controller 460 to the driver interface device 469. This architecture simplifies the work that must be done to make the driver interface device 469 ASIL compliant. It should be appreciated, however, that in other embodiments, the platoon controller 410 may also be a direct listener to commands from the driver interface device. In the embodiment illustrated in FIG. 6, interface 420 includes driver platoon related requests and commands 427 which represent the request sent to and commands received from the driver interface device 469.

In some specific embodiments, the vehicle interface controller 460 is implemented as a single dedicated integrated circuit chip and the platoon controller 410 and gateway processor 470 are each implemented as separate system on modules (SOMs).

The platoon control system hardware architecture illustrated in FIG. 6 is particularly well suited for efficiently handling platooning control related tasks in an ASIL compliant manner using information available from a variety of sources including sources that are not themselves ASIL. With the described arrangement, the powertrain control commands ultimately issued by the control system may be ASIL rated.

The hardware architecture of FIG. 6 also has several advantages from a security standpoint. In the illustrated embodiment, the gateway processor 470 is not connected to any of the vehicle's control related communications buses (e.g., the CAN bus(es)). Therefore, the gateway processor 470, which is potentially the least secure of the three hardware components, is not able to transmit any information directly onto any of the more secure vehicle communications buses or receive any information directly from such buses—which is advantageous from a security standpoint since a nefarious entity cannot gain control the vehicle in any way by somehow hacking into the gateway processor 470. Furthermore, with this arrangement, the gateway processor 470 does not need to be ASIL compliant which greatly simplifies its certification.

In some embodiments, at least one of the vehicle communications buses is a dedicated sensor information bus that only carries sensor based information. The use of sensor information buses is particularly useful for transmitting high volume information such as the information or data transmitted by radar units, lidar units, camera units, ultrasound units, GNSS units, etc. In most applications, the information transmitted over a sensor information bus will be synthesized information. For example, in the context of a radar unit, the information transmitted over the sensor information bus may be the identification of objects detected by the radar unit together with the relative position and relative velocity of such objects. Similar types of information may be received from lidar, cameras and/or other distance measuring technologies. Information transmitted from camera units and/or other sensors may also arranged to predict future movements or intentions of detected objects.

The specific information transmitted over the sensor information bus may vary widely in accordance with the needs and capabilities of any system, and when desired, the transmitted information may include, or take the form of rawer forms for sensor data. An advantage of using one or more dedicated sensor information buses is that the sensor information, which may be both relatively high volume and time critical, does not unduly clog other vehicle information buses and is not delayed by the transmission of other types of information over such buses. It also makes it easy to provide access to the sensor information to components needing such information while still controlling such components access to controllers or devices that such components don't need to have access to—which is desirable from a security standpoint.

Safety Algorithms

In the primary embodiments described above, the safety monitors 465 are resident on the vehicle interface controller 460. Although this architecture is particularly desirable, it should be appreciated that safety monitors may be provided at other locations in the system in addition to, or in some circumstances, in place of, being located on the vehicle interface controller. For example, in some embodiments, it may be desirable for various vehicle controllers such as an ECU or a brake controller to execute its own safety monitors in addition to, or in place of safety monitors executed as part of the vehicle interface control.

An extremely wide variety of different safety algorithms can be implemented by the safety monitors and the information used by the safety algorithms may come from a wide variety of sources. In many circumstances, a safety monitor will utilizes sensor information from the host vehicle and/or a connected or partner vehicle. Virtually any sensor information deemed useful to a safety check may be used. By way of example, some of the sensor information that may be used by one or more safety monitors may come from radar units, lidar units, one or more cameras, ultrasonic distance measuring units, a compass, gyroscopes, GNSS sensors, accelerometers, wheel speed sensors, tire pressure sensors, brake pad wear sensors, brake pressure sensors, engine temperature sensors, ambient temperature sensors, humidity sensors, weather sensors, pedal position sensors, engine speed sensors, engine torque sensors, transmission configuration sensors, engine speed sensors, tire wear sensors, vehicle weight sensors, suspension pressure sensors, trailer identification information, system fault sensors, occupant detection sensors, seatbelt status sensors, etc. The safety monitors may also use system faults identified by various engine or other vehicle diagnostic systems.

In many circumstances, the safety monitors fuse information received from one or more host vehicle sensors, with information (e.g. sensor information) received from other vehicles to verify the reasonableness of the commands (e.g., torque and braking commands) received from the connected vehicle/platoon controller 110. Other safety algorithms may utilize information received from driver inputs alone or in combination with sensor information received from one or both vehicles. Such driver inputs may take the form of inputs to the host (or partner vehicle) driver interface device 469, driver initiated movement of an accelerator or brake pedal, actuation of a retarder or any other available source. Still other safety monitors can utilize information from external sources such as a network operation center or a source of traffic or road information as part of a safety check.

The ability to fuse verified information received from a second (e.g. partner vehicle) with sensor data received from the host vehicle itself and/or host vehicle driver inputs as part of the safety algorithm check is particularly powerful.

In implementations that utilize a vehicle interface controller is often desirable to execute any safety algorithms that utilized verified data received from another vehicle or other external sources on the vehicle interface controller. In this way, any safety algorithms executed on the host vehicle controller cannot be influenced by, and do not need to be aware of, anything that occurs outside of the vehicle, which inherently provides another layer of security.

Message Logging

As mentioned above, the gateway 470 preferably includes a message logger 473 that is configured to log a variety of messages and other information passed there through in order to provide a comprehensive record of platoon session that can be useful for diagnostic, machine learning purposes and other purposes. In general, it is desirable to log all of the control related messages that pass between the vehicles through the gateway. This includes the verified partner state information 444 and the verified host vehicle state information 441 that is passed between the system managers 460 through the gateway 470. It also includes any sensor information transmitted to, from or between the platoon controllers 410, such as GNSS position data (such information is sometimes referred to herein as unverified state information since it is not ASIL verified by the system manager even though it should be appreciated that various data verification can be performed on such data by a GPS unit, the platoon controller, the gateway itself or any other suitable unit if desired).

In some embodiments the platoon controller itself does not have any logging capability—which has the advantage of simplifying the platoon controller's tasks and relieving it of the complexity and computational load associated with logging. In such embodiments it is desirable to transmit commands generated by the platoon controller such as the torque request 422, the braking request 424, retarder request 426 and platoon state request 428 to the gateway for logging purposes even if those commands are not conveyed to the partner vehicle.

When desired, other sensor information that is utilized by the platoon controller but not passed to the partner vehicle such as accelerator pedal inputs, radar scenes or scenes from other environmental sensors such as lidar, camera systems, etc. may be recorded as desired for diagnostic purposes. The specific information recorded may vary based on the design goals of the logging and/or diagnostic system. It is noted that high bandwidth streams that are not directly used in platoon control such as the partner vehicle video feed transmitted to dashboard display 475 or received from the forward facing camera 477 would typically not be logged, although that is possible.

In many embodiments, the system manager 460 also does not have any independent logging capabilities. When that is the case, the system manager can be configured to send any information desired to be logged to the gateway 470 as well. (Such messages pass through the platoon controller 410 in the illustrated embodiments). Examples of information that may be desirable to log may include messages relating to any safety monitor algorithms that detect an unusual situation or a potential problem; the commands receive from the driver interface device, the actions of the safety monitor itself, etc.

In general, all of the messages logged are time stamped so that their order and relative timing can readily be reconstructed as desired.

In the description above, a safety focused architecture that is well suited for use in autonomous vehicle and connected vehicle is described. Although the invention has been described primarily in the context of a platoon control system, it should be appreciated that the described architecture is very well suited for use in a wide variety of connected vehicle application in which the control of a host vehicle is based in part on sensor inputs from one or more other vehicles. Thus, exactly the same architectures can be used in systems in which a connected vehicle controller that generates torque, braking and/or other control commands based in part on inputs from a second vehicle is substituted for the platoon controller.

More broadly, the described use of higher safety level processing of control commands generated by a vehicle controller by a separate system can be used in a wide variety of different autonomous and automated vehicle applications (including both partially and fully autonomous/automated vehicle control). For example, a wide variety of different autonomous/automated vehicle controllers can readily be substituted for the described platoon controller.

Although particular platoon and gap controller architectures are illustrated in FIGS. 2, 3 and 6, it should be appreciated that the specific architectures utilized may vary widely to meet the needs of any particular platooning or other automated vehicle control scheme. As will be apparent to those familiar with the art, the described control functionality can be implemented algorithmically using software or firmware algorithms executing on one or more processors, using programmable logic, using digital or analog components or using any combination of the preceding.

In the detailed description above, it is assumed that the controlled power plant is an internal combustion engine, as for example a diesel engine. However, it should be appreciated that the described control approach can be utilized regardless of the nature of the power plant used to provide torque to drive the host vehicle. Thus, for example, the control techniques are equally applicable to electric vehicles, hybrid vehicles, vehicles using turbine engines and/or any other type of powerplant. Furthermore, although the invention has been described primarily in the context of particular applications related to platooning and vehicle convoying, it should be appreciated that the invention may be applied to a variety of other vehicle control systems involving any of level 1-5 automation, including adaptive cruise control, highway-only automation systems, low-speed only automation systems, etc. Therefore, the present embodiments should be considered illustrative and not restrictive and the invention is not to be limited to the details given herein, but may be modified within the scope and equivalents of the appended claims.

The invention claimed is:

1. A vehicle control system for at least partially automatically controlling a host vehicle, the vehicle control system comprising:
   a vehicle controller, resident on the host vehicle, configured to determine automated vehicle control commands for at least partially automatically controlling the host vehicle based at least in part on sensor information, the automated vehicle control commands each being arranged to be directly or indirectly utilized by one or more host vehicle control units resident on the host vehicle to facilitate implementation of such automated vehicle control commands; and one or more safety monitoring algorithms executed separately from the vehicle controller that, during at least partially automated driving, verify that selected automated vehicle control commands received from the vehicle controller meet selected safety criteria, wherein at least some of the one or more safety monitoring algorithms utilize sensor information in the verification of the automated vehicle control commands received from the vehicle controller, wherein neither the safety algorithms, nor outputs from the safety algorithms are used in the determination of the automated vehicle control commands by the vehicle controller, and wherein the verified vehicle control commands are utilized by the one or more host vehicle control units to facilitate implementation of the automated vehicle control commands.

2. A vehicle control system as recited in claim 1, wherein at least some of the sensor information utilized in the verification of the automated vehicle control commands comprises information received from sensors on a second vehicle.

3. A vehicle control system as recited in claim 1, wherein at least some of the sensor information utilized in the verification of the automated vehicle control commands received from the vehicle controller comprises data received from one or more sensors on the host vehicle.

4. A vehicle control system as recited in claim 2, wherein at least some of the one or more safety monitoring algorithms utilize verified information received from the second vehicle in the verification of the automated vehicle control commands received from the vehicle controller, the verified information received from the second vehicle being verified by a component on the second vehicle that is compliant with a designated safety standard that is at least as high as a designated safety standard required by the safety monitoring algorithms.

5. A vehicle control system as recited in claim 1, wherein the automated vehicle control commands include at least one of a torque request and a braking request.

6. A vehicle control system as recited in claim 1, wherein the one or more host vehicle control units are selected from the group consisting of: an engine control unit, a powertrain control module, and a braking controller.

7. A vehicle control system as recited in claim 1, wherein the vehicle controller is separate from the one or more host vehicle control units.

8. A vehicle control system as recited in claim 2, wherein the sensor information received from the second vehicle that is utilized by the one or more safety monitoring algorithms is received from a component on the second vehicle that is compliant with a safety standard that is at least as high as a safety standard with which the one or more safety monitoring algorithms are compliant and higher than a safety standard with which the vehicle controller is compliant.

9. A vehicle control system as recited in claim 1, wherein at least some of the safety algorithms are executed on at least one of the host vehicle control units.

10. A vehicle control system as recited in claim 1, further comprising:

a vehicle interface controller arranged to manage communications between the vehicle controller and one or more host vehicle control units, the vehicle interface controller being configured to receive the automated vehicle control commands from the vehicle controller and to communicate corresponding vehicle control commands to the appropriate host vehicle control unit(s); and wherein at least some of the safety algorithms are executed by the vehicle interface controller.

11. A vehicle control system as recited in claim 10, wherein at least some of the safety algorithms are executed on at least one of the host vehicle control units.

12. A vehicle control system as recited in claim 1, wherein a controller that hosts at least one of the safety monitoring algorithms has an ASIL rating that is higher than an ASIL rating for the vehicle controller.

13. A vehicle control system as recited in claim 1, wherein a controller that hosts at least one of the safety monitoring algorithms has an ASIL rating that is at least ASIL-C compliant.

14. A vehicle control system as recited in claim 13, wherein the vehicle controller is QM rated under ISO 26262.

15. A vehicle control system for at least partially automatically controlling a host vehicle, the vehicle control system comprising:

a vehicle controller configured to determine vehicle control commands for at least partially automatically controlling the host vehicle based at least in part on sensor information, the vehicle control commands each being arranged to be directly or indirectly utilized by one or more host vehicle control units resident on the host vehicle to facilitate implementation of such vehicle control commands, the vehicle controller having an ASIL rating; and a second controller that hosts one or more safety monitoring algorithms that, during at least partially automated driving, verify that selected vehicle control commands received from the vehicle controller meet selected safety criteria, wherein at least some of the one or more safety algorithms utilize verified sensor information from a second vehicle in the verification of the commands received from the vehicle controller, the verified sensor information received from the second vehicle being verified by a component on the second vehicle that is compliant with a designated safety standard; and wherein the second controller has an ASIL rating that is higher than the ASIL rating for the vehicle controller, and wherein the component on the second vehicle that verified the verified sensor information received from the second vehicle has an ASIL rating that is at least as high as the ASIL rating of the second controller.

16. A vehicle control system as recited in claim 15, wherein the vehicle controller is a platoon controller, and the second vehicle is a platoon partner, and the safety monitoring algorithms are configured to verify that selected safety criteria are met during platooning.

17. A vehicle interface controller for use in a vehicle control system for at least partially automatically controlling a host vehicle, the vehicle interface controller being configured to receive selected automated vehicle control commands from a vehicle controller configured to determine the automated vehicle control commands to facilitate at least partially automatically controlling the host vehicle and to communicate such automated vehicle control commands to one or more host vehicle control units resident on the host vehicle in a format suitable for use by such one or more host vehicle control units, the vehicle interface controller comprising:

one or more safety monitoring algorithms executed on the vehicle interface controller that, during the at least partially automated driving, verify that the selected automated vehicle control commands received from the vehicle controller meet selected safety criteria, wherein at least some of the one or more safety algorithms utilize sensor data in the verification of the commands received from the vehicle controller.

18. A vehicle interface controller as recited in claim 17, wherein the sensor data comprises data received from sensors on the host vehicle.

19. A vehicle interface controller as recited in claim 17, wherein at least some of the one or more safety algorithms utilize verified information received from a second vehicle in the verification of the commands received from the vehicle controller, the verified information received from the second vehicle being verified by a component on the second vehicle that is compliant with a designated safety standard that is at least as high as a designated safety standard required by the safety monitoring algorithms.

20. A vehicle interface controller as recited in claim 17, wherein the one or more host vehicle control units include at least one of an engine control unit, a powertrain control module or a braking controller.

21. A vehicle interface controller as recited in claim 17, wherein the vehicle control commands include at least one of a torque request and a braking request.

22. A vehicle control system as recited in claim 17, wherein the vehicle interface controller has an ASIL rating that is higher than an ASIL rating for the vehicle controller.

23. A vehicle interface controller for use in a vehicle control system for at least partially automatically controlling a host vehicle, the vehicle interface controller being configured to receive selected vehicle control commands from a vehicle controller and to communicate such vehicle control commands to one or more host vehicle control units resident on the host vehicle in a format suitable for use by such one or more host vehicle control units, the vehicle interface controller comprising:
one or more safety monitoring algorithms executed on the vehicle interface controller that, during the at least partially automated driving, verify that the selected vehicle control commands received from the vehicle controller meet selected safety criteria, wherein at least some of the one or more safety algorithms utilize sensor data in the verification of the commands received from the vehicle controller, wherein at least some of the one or more safety algorithms utilize verified information received from a second vehicle in the verification of the commands received from the vehicle controller, the verified information received from the second vehicle being verified by a component on the second vehicle that is compliant with a designated safety standard, and wherein the vehicle interface controller has an ASIL rating that is higher than an ASIL rating of the vehicle controller, and wherein the component on the second vehicle that verified the verified sensor information received from the second vehicle has an ASIL rating that is at least as high as the ASIL rating of the vehicle interface controller.

24. A vehicle interface controller as recited in claim 19, wherein the vehicle controller from which the vehicle control commands are received is a platoon controller, and the second vehicle is a platoon partner, and the safety monitoring algorithms are configured to verify that selected safety criteria are met during platooning.

25. A host vehicle control unit for use in conjunction with a vehicle control system for at least partially automatically controlling a host vehicle, the host vehicle control unit being configured to receive selected vehicle control commands directly or indirectly from a vehicle controller configured to determine vehicle control commands for at least partially automatically controlling the host vehicle, the host vehicle control unit comprising:
one or more safety monitoring algorithms executed on the host vehicle control unit that, during the at least partially automated driving, verify that the selected vehicle control commands received from the vehicle controller meet selected safety criteria; and
wherein at least some of the one or more safety algorithms utilize verified information received from a second vehicle in the verification of the vehicle control commands received from the vehicle controller, the verified information received from the second vehicle being verified by a component on the second vehicle that is compliant with a designated safety standard.

26. A host vehicle control unit as recited in claim 25, wherein at least some of the one or more safety algorithms utilize sensor data in the verification of the commands received from the vehicle controller.

27. A host vehicle control unit as recited in claim 26, wherein the sensor data comprises data received from sensors on the host vehicle.

28. A host vehicle control unit as recited in claim 25, wherein the host vehicle control unit is selected from the group consisting of: an engine control unit, a powertrain control module, and a braking controller.

29. A host vehicle control unit as recited in claim 25, wherein the vehicle control commands include at least one of a torque request and a braking request.

30. A host vehicle control unit as recited in claim 25, wherein the host vehicle control unit has an ASIL rating that is higher than an ASIL rating for the vehicle controller.

* * * * *